(12) United States Patent
Setlur et al.

(10) Patent No.: US 10,817,527 B1
(45) Date of Patent: Oct. 27, 2020

(54) SYSTEMS AND METHODS OF USING NATURAL LANGUAGE PROCESSING FOR VISUAL ANALYSIS OF A DATA SET

(71) Applicant: Tableau Software, Inc., Seattle, WA (US)

(72) Inventors: Vidya R. Setlur, Portola Valley, CA (US); Sarah E. Battersby, Seattle, WA (US); Melanie K. Tory, Palo Alto, CA (US); Richard C. Gossweiler, III, Sunnyvale, CA (US); Angel Xuan Chang, Stanford, CA (US); Isaac J. Dykeman, Bethesda, MD (US); Md Enamul Hoque Prince, Vancouver (CA)

(73) Assignee: Tableau Software, Inc., Seattle, WA (US)

( * ) Notice: Subject to any disclaimer, the term of this patent is extended or adjusted under 35 U.S.C. 154(b) by 138 days.

(21) Appl. No.: 15/804,991

(22) Filed: Nov. 6, 2017

Related U.S. Application Data

(63) Continuation-in-part of application No. 15/486,265, filed on Apr. 12, 2017, now Pat. No. 10,515,121.

(Continued)

(51) Int. Cl.
*G06F 7/00* (2006.01)
*G06F 16/248* (2019.01)
(Continued)

(52) U.S. Cl.
CPC ........ *G06F 16/248* (2019.01); *G06F 3/04847* (2013.01); *G06F 16/243* (2019.01);
(Continued)

(58) Field of Classification Search
CPC .... G06F 16/951; G06F 16/901; G06F 16/248; G06F 16/221; G06F 16/26
See application file for complete search history.

(56) References Cited

U.S. PATENT DOCUMENTS

| 7,019,749 | B2 | 3/2006 | Guo et al. |
| 7,089,266 | B2 * | 8/2006 | Stolte ............... G06F 40/18 |
| | | | 707/769 |

(Continued)

OTHER PUBLICATIONS

Allen, J. Recognizing Intentions from Natural Language Utterances. In Computational Models of Discourse, M. Brady, Ed. M.I.T. Press, Cambridge, Massachusetts, 1982, 64 pgs.

(Continued)

*Primary Examiner* — Daniel A Kuddus
(74) *Attorney, Agent, or Firm* — Morgan, Lewis & Bockius LLP

(57) ABSTRACT

A method uses natural language processing for visual analysis of a dataset by a computer. The computer displays a data visualization based on a dataset retrieved from a database using a set of one or more queries. The computer receives user input (e.g., keyboard or voice) to specify a natural language command related to the displayed data visualization. Based on the displayed data visualization, the computer extracts one or more independent analytic phrases from the natural language command. The computer further computes semantic relatedness of extracted analytic phrases, and computes analytical functions associated with the extracted analytic phrases, thereby creating functional phrases. The computer requeries the database using an updated set of one or more queries based on the created functional phrases, thereby retrieving an updated dataset. The computer then displays an updated data visualization using the updated dataset.

19 Claims, 25 Drawing Sheets

Related U.S. Application Data

(60) Provisional application No. 62/321,695, filed on Apr. 12, 2016, provisional application No. 62/418,052, filed on Nov. 4, 2016, provisional application No. 62/500,999, filed on May 3, 2017.

(51) Int. Cl.

| | | |
|---|---|---|
| *G06F 3/0484* | (2013.01) | |
| *G06K 9/62* | (2006.01) | |
| *G06F 16/242* | (2019.01) | |
| *G06F 16/2452* | (2019.01) | |
| *G06F 40/30* | (2020.01) | |

(52) U.S. Cl.
CPC ........ *G06F 16/24522* (2019.01); *G06F 40/30* (2020.01); *G06K 9/6223* (2013.01)

(56) References Cited

U.S. PATENT DOCUMENTS

| | | | |
|---|---|---|---|
| 7,391,421 B2 | 6/2008 | Guo et al. | |
| 7,606,714 B2* | 10/2009 | Williams | G10L 13/027 704/275 |
| 7,716,173 B2* | 5/2010 | Stolte | G06F 16/212 707/600 |
| 8,489,641 B1 | 7/2013 | Seefeld et al. | |
| 8,713,072 B2* | 4/2014 | Stolte | G06F 16/252 707/802 |
| 8,972,457 B2* | 3/2015 | Stolte | G06F 16/2282 707/802 |
| 9,183,235 B2* | 11/2015 | Stolte | G06F 40/177 |
| 9,477,752 B1 | 10/2016 | Romano | |
| 9,501,585 B1* | 11/2016 | Gautam | G06F 16/26 |
| 9,575,720 B2 | 2/2017 | Faaborg et al. | |
| 9,794,613 B2 | 10/2017 | Jang et al. | |
| 9,858,292 B1* | 1/2018 | Setlur | G06F 16/248 |
| 9,953,645 B2* | 4/2018 | Bak | G10L 15/22 |
| 2004/0030741 A1* | 2/2004 | Wolton | G06F 16/954 709/202 |
| 2006/0021840 A1 | 2/2006 | Kimes et al. | |
| 2006/0218140 A1* | 9/2006 | Whitney | G06F 16/338 |
| 2006/0259394 A1* | 11/2006 | Cushing | G06Q 40/06 705/37 |
| 2007/0174350 A1* | 7/2007 | Pell | G06F 9/451 |
| 2009/0299990 A1* | 12/2009 | Setlur | G06F 16/58 |
| 2010/0030552 A1 | 2/2010 | Chen et al. | |
| 2010/0110076 A1* | 5/2010 | Hao | G07C 3/12 345/440 |
| 2010/0313164 A1 | 12/2010 | Louch et al. | |
| 2012/0179713 A1* | 7/2012 | Stolte | G06F 40/18 707/769 |
| 2013/0031126 A1* | 1/2013 | Setlur | G06F 16/248 707/769 |
| 2014/0192140 A1* | 7/2014 | Peevers | A63F 13/10 348/14.08 |
| 2015/0058318 A1* | 2/2015 | Blackwell | G06F 3/04817 707/722 |
| 2015/0123999 A1 | 5/2015 | Ofstad et al. | |
| 2015/0310855 A1* | 10/2015 | Bak | G10L 15/22 704/249 |
| 2015/0379989 A1 | 12/2015 | Balasubramanian et al. | |
| 2016/0261675 A1 | 9/2016 | Block et al. | |
| 2018/0108359 A9 | 4/2018 | Gunn et al. | |

OTHER PUBLICATIONS

Androutsopoulos, I., Ritchie, G. D., and Thanisch, P. Natural language interfaces to databases—an introduction. Natural Language Engineering 1, Mar. 16, 1995, 50 pgs.

Aurisano, J., Kumar, A., Gonzales, A., Reda, K., Leigh, J., Di Eugenio, B., and Johnson, A. Show me data? observational study of a conversational interface in visual data exploration. In Poster at IEEE VIS 2015, IEEE (2015), 2 pgs.

Bostock, M., Ogievetsky, V., and Heer, J. D3: Data-driven documents. IEEE Transactions on Visualization & Computer Graphics (Proc. InfoVis), Oct. 23, 2011, 9 pgs.

Carbonell, J. G., Boggs, W. M., Mauldin, M. L., and Anick, P. G. The xcalibur project, a natural language interface to expert systems and data bases, 1985, 5 pgs.

Cover, T. M., and Thomas, J. A. Elements of Information Theory. Wiley-Interscience, New York, NY, USA, 1991, 36 pgs.

Cox, K., Grinter, R. E., Hibino, S. L., Jagadeesan, L. J., and Mantilla, D. A multi-modal natural language interface to an information visualization environment. International Journal of Speech Technology 4, 3 (2001), 18 pgs.

Egenhofer, M. Spatial sql: A query and presentation language. IEEE Transactions on Knowledge and Data Engineering 6, 1 (1994), 12 pgs.

Finin, T., Joshi, A. K., and Webber, B. Natural language interactions with artificial experts. Proceedings of the IEEE 74, 7 (Jun. 1986), 19 pgs.

Frank, A. U., and Mark, D. M. Language issues for geographical information systems. In Geographical Information Systems: Principles and Applications, vol. 1, D. Maguire, M. Goodchild, and D. Rhind, Eds. Longman, London, 1991, 26 pgs.

Gao, T., Dontcheva, M., Adar, E., Liu, Z., and Karahalios, K. G. Datatone: Managing ambiguity in natural language interfaces for data Visualization. In Proceedings of the 28th Annual ACM Symposium on User Interface Software Technology, UIST '15, ACM (New York, NY, USA, 2015), 12 pgs.

Grammel, L., Tory, M., and Storey, M. A. How information visualization novices construct Visualizations. IEEE Transactions on Visualization and Computer Graphics 16, 6 (Nov. 2010), 10 pgs.

IBM Watson Analytics. http://www.ibm.com/analytics/watson-analytics/, downloaded on May 9, 2017, 6 pgs.

Lawson, I-want-to-go moments: From search to store. https://www.thinkwithgoogle.com/articles/i-want-to-go-micro-moments.html, Apr. 2015, 7 pgs.

Li, F., and Jagadish, H. V. Constructing an interactive natural language intertace for relational databases. Proc. VLDB Endow. 8, 1 (Sep. 2014), 12 pgs.

Microsoft Q & A. https://powerbi.microsoft.com/en-us/documentation/powerbi-service-q-and-a/, Mar. 14, 2017, 5 pgs.

Montello, D., Goodchild, M., Gottsegen, J., and Fohl, P. Where's downtown? behavioral methods for determining referents for vague spatial queries. Spatial Cognition and Computation 3, 2&3 (2003), 20 pgs.

NarrativeScience, Turn your data into better decisions with Quill, https://www.narrativescience.com/quill, downloaded on May 9, 2017, 12 pgs.

Ng, H. T., and Zelle, J. Corpus-based approaches to semantic interpretation in natural language processing. AI Magazine Winter 1997, (1997), 20 pgs.

Node.js®. https://nodejs.org/, downloaded on May 10, 2017, 1 pg.

Oviatt, S., and Cohen, P. Perceptual user interfaces: Multimodal interfaces that process what comes naturally. Commun. ACM 43, 3 (Mar. 2000), 9 pgs.

Parr, T. The Definitive ANTLR 4 Reference, 2nd ed. Pragmatic Bookshelf, 2013, 322 pgs.

Pedersen, T., Patwardhan, S., and Michelizzi, J. Wordnet::similarity: Measuring the relatedness of concepts. In Demonstration Papers at HLT-NAACL 2004, HLT-NAACL-Demonstrations '04, Association for Computational Linguistics (Stroudsburg, PA, USA, 2004), 2 pgs.

Popescu, A.-M., Etzioni, O., and Kautz, H. Towards a theory of natural language interfaces to databases. In Proceedings of the 8th International Conference on Intelligent User Interfaces, IUI '03, ACM (New York, NY, USA, 2003), 9 pgs.

Pustejovsky, J., Castaño, J., Ingria, R., Saurí, R., Gaizauskas, R., Setzer, A., and Katz, G. Timeml: Robust specification of vvent and temporal expressions in text. In in Fifth International Workshop on Computational Semantics (IWCS-5 (2003), 7 pgs.

Reinhart, T. Pragmatics and Linguistics: An Analysis of Sentence Topics. IU Linguistics Club publications. Reproduced by the Indiana University Linguistics Club, 1982, 5 pgs.

(56) References Cited

OTHER PUBLICATIONS

Sun, Y., L. J. J. A., and Di Eugenio, B. Articulate: Creating meaningful visualizations from natural language. In Innovative Approaches of Data Visualization and Visual Analytics, IGI Global, Hershey, PA (2014), 20 pgs.

ThoughtSpot. Search-Driven Analytics for Humans, http://www.thoughtspot.com/, downloaded May 9, 2017, 9 pgs.

Turf: Advanced geospatial analysis for browsers and node. http://turfjs.org, downloaded May 9, 2017, 2 pgs.

Wikipedia, Extended Backus-Naur Form. https://en.wikipedia.org/wiki/Extended_Backus%E2%80%93Naur_Form, last edited on Jan. 7, 2017, 7 pgs.

Winograd, T. Procedures as a Representation for Data in a Computer Program for Understanding Natural Language. PhD thesis, Feb. 1971, 472 pgs.

WolframAlpha. Profesional-grade computational, https://www.wolframalpha.com/, downloaded May 9, 2017, 25 pgs.

Wu, Z., and Palmer, M. Verbs semantics and lexical selection. In Proceedings of the 32nd Annual Meeting on Association for Computational Linguistics, ACL '94, Association for Computational Linguistics (Stroudsburg, PA, USA, 1994), 6 pgs.

Setlur, Pre-Interview First Office Action dated Jul. 5, 2018, received in U.S. Appl. No. 15/486,265, 5 pgs.

Setlur, First Action Interview Office Action dated Aug. 29, 2018, received in U.S. Appl. No. 15/486,265, 6 pgs.

Setlur, Final Office Action dated Apr. 25, 2019, received in U.S. Appl. No. 15/486,265, 15 pgs.

Setlur, Notice of Allowance dated Sep. 6, 2019, received in U.S. Appl. No. 15/486,265, 13 pgs.

Setkur et al., Eviza: A Natural Language Interface for Visual Analysis, ACM Oct. 16, 2016, 13 pgs.

Tableau, Communication Pursuant to Rules 161(1) and 162, EP18729514.2, dated Jun. 17, 2019, 3 pgs.

Tableau Software, Inc., International Search Report and Written Opinion, PCT/US2018/030959, dated Sep. 14, 2018, 13 pgs.

Tableau Software, Inc., International Preliminary Report on Patentability, PCT/US2018/030959, dated Nov. 5, 2019, 11 pgs.

Setlur, Preinterview 1st Office Action, U.S. Appl. No. 15/978,062, dated Mar. 6, 2020, 4 pgs.

Setlur, Notice of Allowance, U.S. Appl. No. 15/978, dated May 29, 2020, 19 pgs.

Setlur, Office Action, U.S. Appl. No. 15/978,066, dated Mar. 18, 2020, 23 pgs.

Setlur, Office Action, U.S. Appl. No. 15/978,067, dated Feb. 21, 2020, 20 pgs.

\* cited by examiner

SYSTEMS AND METHODS OF USING NATURAL LANGUAGE PROCESSING FOR VISUAL ANALYSIS OF A DATA SET

RELATED APPLICATIONS

This application is a continuation-in-part of U.S. patent application Ser. No. 15/486,265, filed Apr. 12, 2017, entitled "Systems and Methods of Using Natural Language Processing for Visual Analysis of a Data Set," which claims priority to both (1) U.S. Provisional Application Ser. No. 62/321,695, filed Apr. 12, 2016, entitled "Using Natural Language Processing for Visual Analysis of a Data Set" and (2) U.S. Provisional Application Ser. No. 62/418,052, filed Nov. 4, 2016, entitled "Using Natural Language Processing for Visual Analysis of a Data Set," each of which is incorporated by reference herein in its entirety. This application also claims priority to U.S. Provisional Application Ser. No. 62/500,999, filed May 3, 2017, entitled "Applying Pragmatics Principles for Interaction with Visual Analytics," which is incorporated by reference herein in its entirety.

This application is related to U.S. Pat. No. 9,183,235, filed Mar. 3, 2015, which is incorporated by reference herein in its entirety.

TECHNICAL FIELD

The disclosed implementations relate generally to data visualization and more specifically to systems, methods, and user interfaces that enable users to interact with and explore datasets using a natural language interface.

BACKGROUND

Data visualization applications enable a user to understand a data set visually, including distribution, trends, outliers, and other factors that are important to making business decisions. Some data sets are very large or complex, and include many data fields. Various tools can be used to help understand and analyze the data, including dashboards that have multiple data visualizations. However, some functionality may be difficult to use or hard to find within a complex user interface. Most systems return only very basic interactive visualizations in response to queries, and others require expert modeling to create effective queries. Other systems require simple closed-ended questions, and then are only capable of returning a single text answer or a static visualization.

SUMMARY

Accordingly, there is a need for tools that allow users to effectively utilize functionality provided by data visualization applications. One solution to the problem is providing a natural language interface as part of a data visualization application (e.g., within the user interface for the data visualization application) for an interactive query dialog that provides graphical answers to natural language queries. The natural language interface allows users to access complex functionality using ordinary questions or commands. In this way, the natural language interface allows users to efficiently explore data displayed (e.g., in a data visualization) within the data visualization application.

In accordance with some implementations, a method executes at an electronic device with a display. For example, the electronic device can be a smart phone, a tablet, a notebook computer, or a desktop computer. The device displays a data visualization based on a dataset retrieved from a database using a set of one or more database queries. A user specifies a natural language command related to the displayed data visualization. Based on the displayed data visualization, the device extracts one or more independent analytic phrases from the natural language command. The device then computes semantic relatedness of the extracted analytic phrases, and analytical functions associated with the extracted analytic phrases, thereby creating functional phrases. The device then requeries the database using an updated set of one or more database queries based on the created functional phrases, thereby retrieving an updated dataset and displaying an updated data visualization using the updated dataset. In some instances, requerying the database is performed locally at the computing device using cached or stored data at the computing device. For example, requerying is commonly performed locally when the natural language command specifies one or more filters.

In some implementations, the semantic relatedness of the extracted analytic phrases is computed by (1) training a plurality of neural network models on a large corpus of text, and (2) for each phrase in the extracted analytic phrases: (a) generating a plurality of word embeddings for the phrase using the trained plurality of neural network models, and (b) generating statistically significant similar words for the plurality of word embeddings using a feature reduction algorithm. In some implementations, the plurality of neural network models comprises word2vec models that use architectural models, such as a continuous bag of words model architecture and/or a skip-gram model architecture, to learn vector representations of words. In some implementations, training the plurality of neural network models uses a plurality of training methods including a training method with negative sampling and a training method without negative sampling. In some implementations, the large corpus of text contains words with semantic meanings found to be useful in Natural Language Processing (NLP) tasks. In some implementations, the feature reduction algorithm used is k-means clustering. In some implementations, the k-means clustering computes a nearest mean using semantic distance between words. In some implementations, the semantic relatedness of the extracted analytic phrases is computed by receiving a large lexical database, and for each phrase in the extracted analytic phrases, extracting synonyms for the phrase from the received large lexical database. In some implementations, the large lexical database is WordNet.

In some implementations, the analytical functions are computed by obtaining word definitions for the extracted analytic phrases from a publicly available dictionary, calculating a set of stemmed words by stemming the obtained word definitions, computing a bag of words based on the set of stemmed words, determining if the bag of words contains a predefined adjective, and, when the bag of words contains the predefined adjective, mapping the predefined adjective to an analytical function.

In some implementations, the device computes the analytical functions by identifying descriptors within the extracted analytic phrase and by mapping appropriate functions to the descriptors.

In some implementations, a first functional phrase of the created functional phrases comprises a parameterized data selection criterion. In some implementations, the device requeries the database, which includes selecting an initial range for values of the parameters of the parameterized data selection criterion. In some implementations, the device displays an editable user interface control corresponding to the parameterized data selection criterion. The user interface control displays the current values of the parameters. In some implementations, the user interface control allows adjustment of functional phrases. In some implementations, the user interface control displays a slider. User input on the slider adjusts the functional phrases.

In some implementations, when the natural language command refers to visualization characteristics of one or more data marks in the displayed data visualizations, the device also scans the displayed data visualizations to identify one or more of the displayed data visualizations that contain data marks whose characteristics correspond to the natural language command (e.g., a "red line," a "blue spike," or a "sharp drop"). In some implementations, the device also highlights the data marks whose characteristics correspond to the natural language command. In some implementations, the visualization characteristics includes one or more of color, size, and shape, and/or corresponds to a visual encoding of data marks. In some implementations, the visual encoding is one or more of color, size, and shape.

Typically, an electronic device includes one or more processors, memory, a display, and one or more programs stored in the memory. The programs are configured for execution by the one or more processors and are configured to perform any of the methods described herein. The one or more programs include instructions for displaying a data visualization based on a dataset retrieved from a database using a set of one or more queries. The one or more programs also include instructions for receiving a user input to specify a natural language command related to the displayed data visualization. Based on the displayed data visualization, the one or more programs further include instructions for extracting one or more independent analytic phrases from the natural language command. The one or more programs also include instructions for computing semantic relatedness of the extracted analytic phrases, and computing analytical functions associated with the extracted analytic phrases, thereby creating functional phrases. The one or more programs also include instructions for requerying the database using an updated set of one or more queries based on the created functional phrases, thereby retrieving an updated dataset, and displaying an updated data visualization using the updated dataset.

In some implementations, a non-transitory computer readable storage medium stores one or more programs configured for execution by a computing device having one or more processors, memory, and a display. The one or more programs are configured to perform any of the methods described herein. The one or more programs include instructions for displaying a data visualization based on a dataset retrieved from a database using a set of one or more queries. The one or more programs also include instructions for receiving a user input to specify a natural language command related to the displayed data visualization. Based on the displayed data visualization, the one or more programs further include instructions for extracting one or more independent analytic phrases from the natural language command. The one or more programs also include instructions for computing semantic relatedness of the extracted analytic phrases, and computing analytical functions associated with the extracted analytic phrases, thereby creating functional phrases. The one or more programs also include instructions for requerying the database using an updated set of one or more queries based on the created functional phrases, thereby retrieving an updated dataset, and displaying an updated data visualization using the updated dataset.

Thus methods, systems, and graphical user interfaces are disclosed that allow users to efficiently explore data displayed within a data visualization application.

Both the foregoing general description and the following detailed description are exemplary and explanatory, and are intended to provide further explanation of the invention as claimed.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
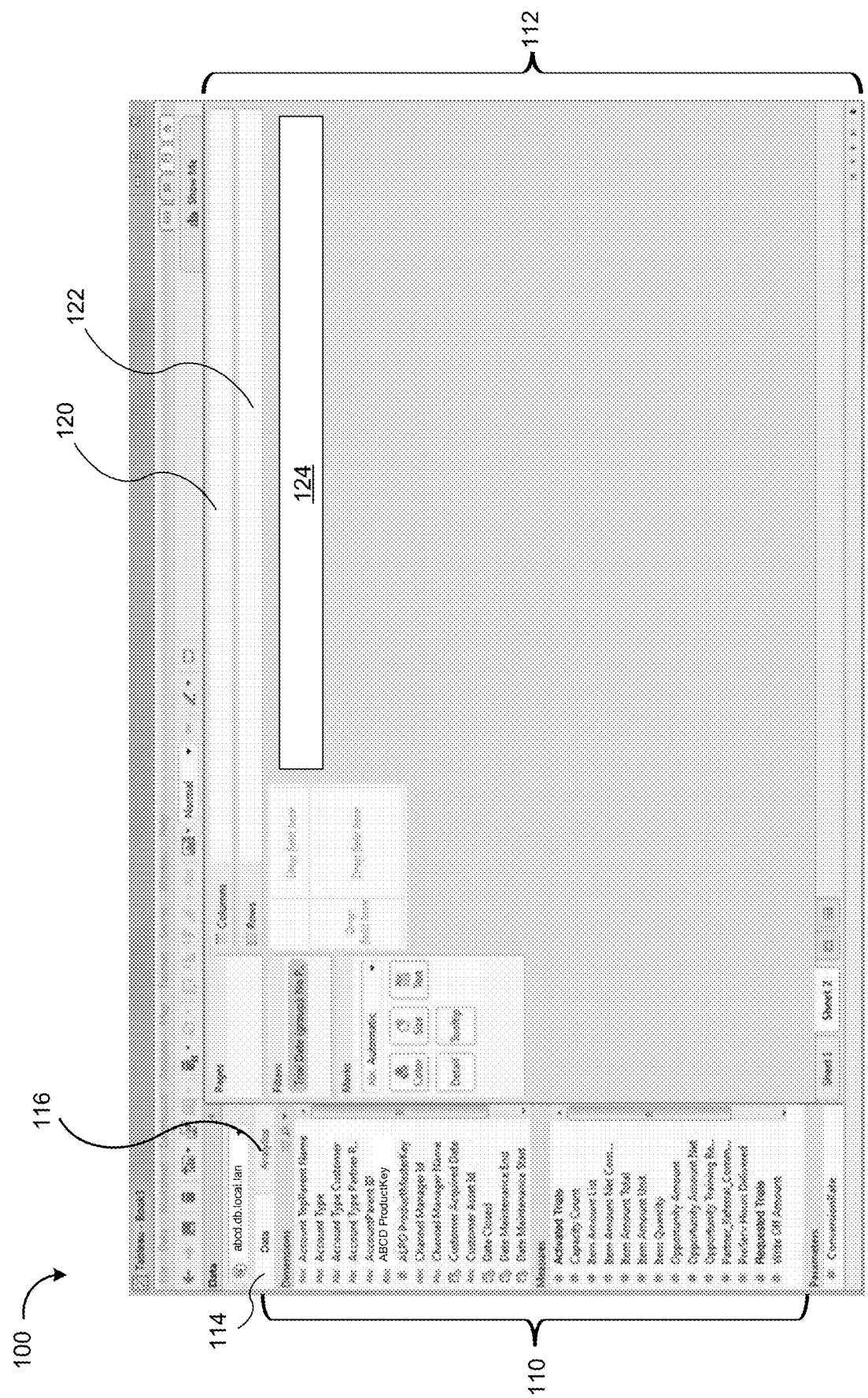
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets.

In some implementations, the graphical user interface 100 also includes a natural language processing region 124. The natural language processing region 124 includes an input bar (also referred to herein as a command bar) for receiving natural language commands. A user may interact with the input bar to provide commands. For example, the user may type a command in the input bar to provide the command. In addition, the user may indirectly interact with the input bar by speaking into a microphone (e.g., an audio input device 220) to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language processing region 124) to further explore the displayed data visualization. In some instances, a user creates the initial association using the natural language processing region 124, which results in one or more data elements being placed in the column shelf 120 and the row shelf 122. For example, the user may provide a command to create a relationship between data element X and data element Y. In response to receiving the command, the column shelf 120 and the row shelf 122 may be populated with the data elements (e.g., the column shelf 120 may be populated with data element X and the row shelf 122 may be populated with data element Y, or vice versa).

Figure 2:
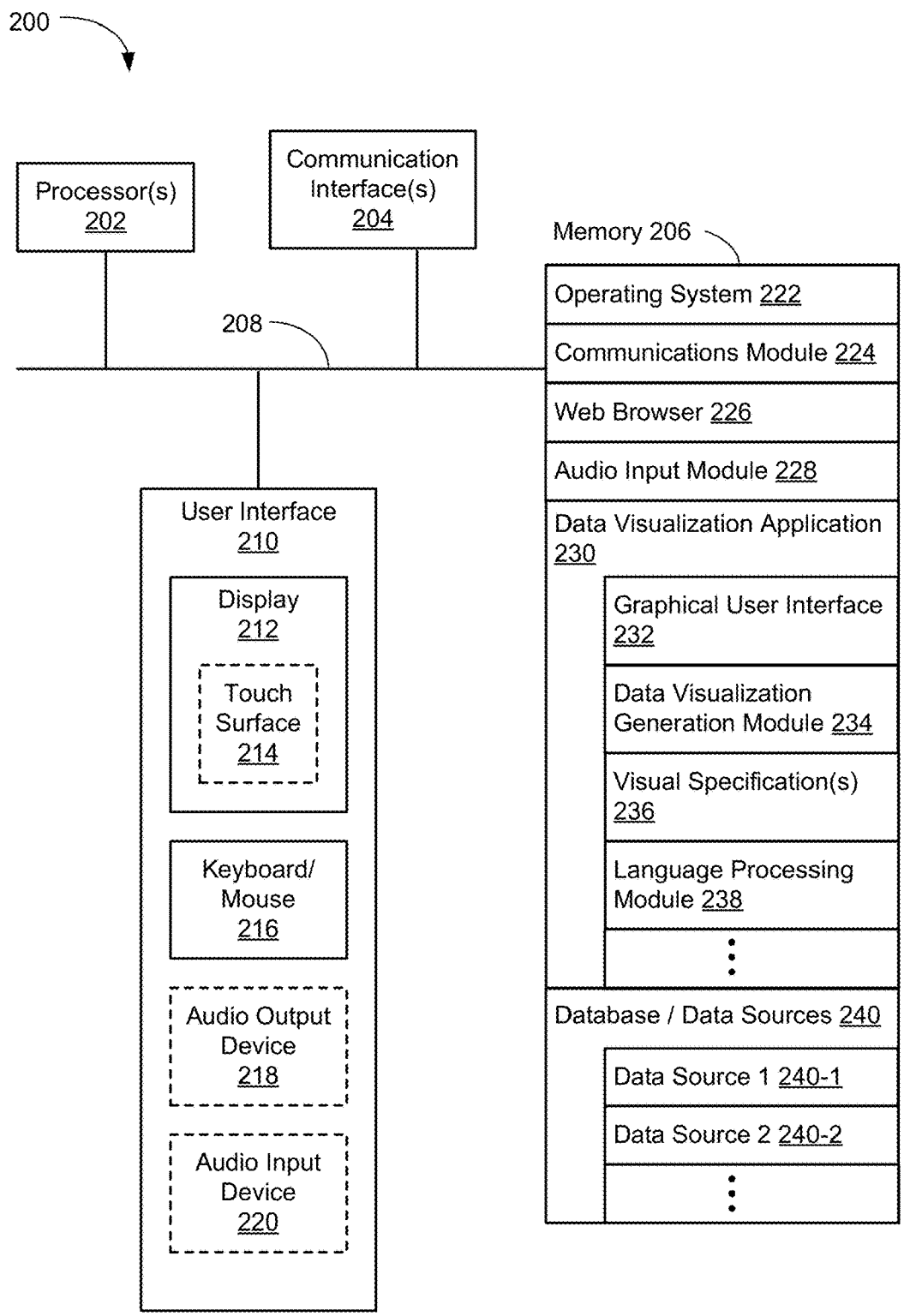
FIG. 2 is a block diagram of a computing device according to some implementations.

FIG. 2 is a block diagram illustrating a computing device 200, which can display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone and voice recognition to supplement or replace the keyboard. Optionally, the computing device 200 includes an audio input device 220 (e.g., a microphone) to capture audio (e.g., speech from a user).

The memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 206 includes one or more storage devices remotely located from the processor(s) 202. The memory 206, or alternately the non-volatile memory device(s) within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication network interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230);
- a data visualization application 230 for generating data visualizations and related features. The application 230 includes a graphical user interface 232 (e.g., the graphical user interface 100 illustrated in FIG. 1) for a user to construct visual graphics. For example, a user selects one or more data sources 240 (which may be stored on the computing device 200 or stored remotely), selects data fields from the data source(s), and uses the selected fields to define a visual graphic; and
- zero or more databases or data sources 240 (e.g., a first data source 240-1 and a second data source 240-2), which are used by the data visualization application 230. In some implementations, the data sources are stored as spreadsheet files, CSV files, text files, JSON files, XML files, or flat files, or stored in a relational database.

In some implementations, the data visualization application 230 includes a data visualization generation module 234, which takes user input (e.g., a visual specification 236), and generates a corresponding visual graphic. The data visualization application 230 then displays the generated visual graphic in the user interface 232. In some implementations, the data visualization application 230 executes as a standalone application (e.g., a desktop application). In some implementations, the data visualization application 230 executes within the web browser 226 or another application using web pages provided by a web server (e.g., a server-based application).

In some implementations, the information the user provides (e.g., user input) is stored as a visual specification 236. In some implementations, the visual specification 236 includes previous natural language commands received from a user or properties specified by the user through natural language commands.

In some implementations, the data visualization application 230 includes a language processing module 238 for processing (e.g., interpreting) commands provided by a user of the computing device. In some implementations, the commands are natural language commands (e.g., captured by the audio input device 220). In some implementations, the language processing module 238 includes sub-modules such as an autocomplete module, a pragmatics module, and an ambiguity module, each of which is discussed in further detail below.

In some implementations, the memory 206 stores metrics and/or scores determined by the language processing module 238. In addition, the memory 206 may store thresholds and other criteria, which are compared against the metrics and/or scores determined by the language processing module 238. For example, the language processing module 238 may determine a relatedness metric (discussed in detail below) for an analytic word/phrase of a received command. Then, the language processing module 238 may compare the relatedness metric against a threshold stored in the memory 206.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3A:
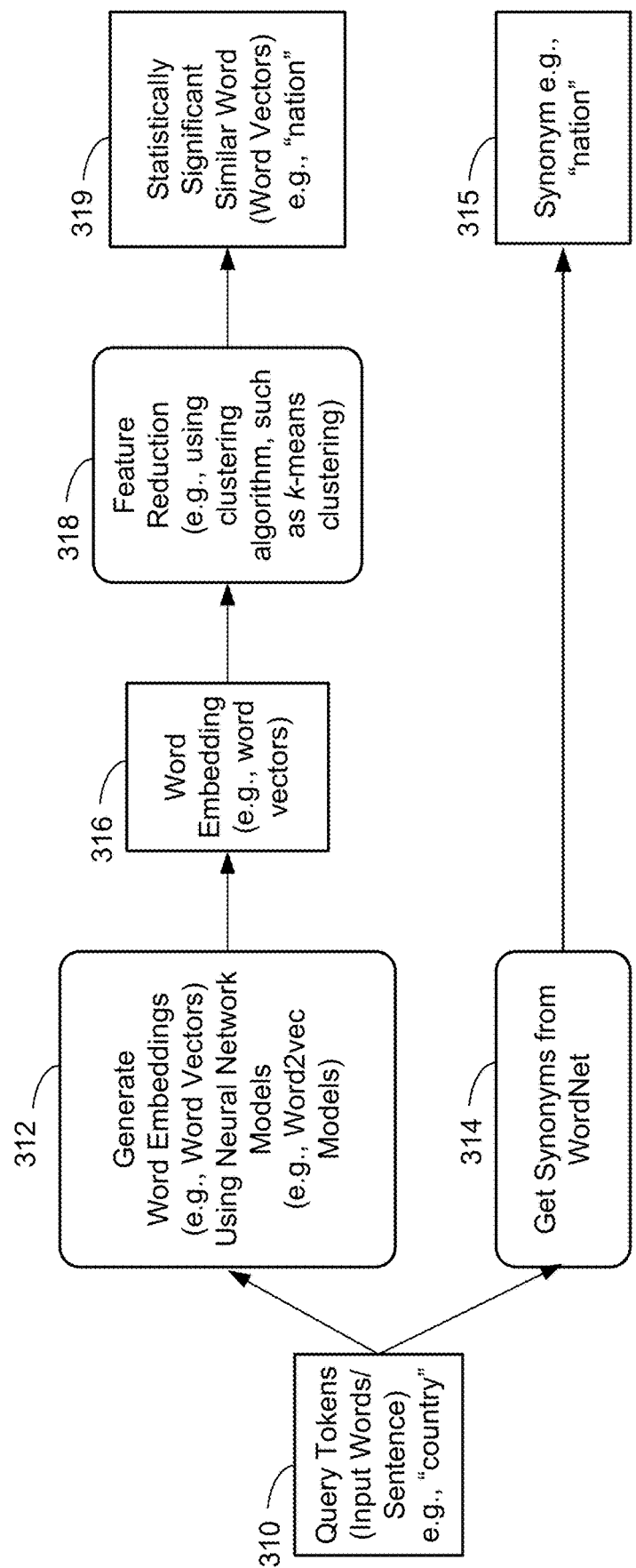
FIGS. 3A-3D are process flow diagrams illustrating a process for using natural language for visual analysis of a dataset according to some implementations.
Figure 3B:
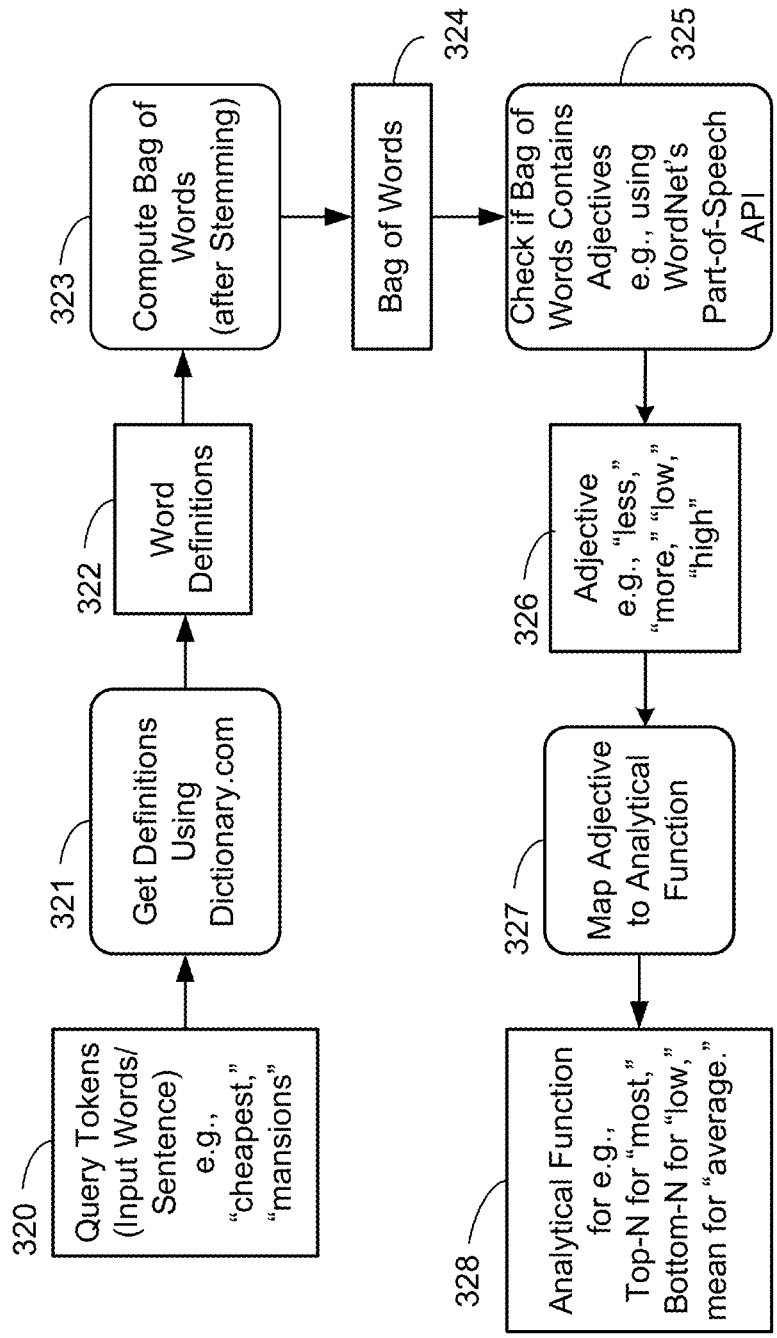
Figure 3C:
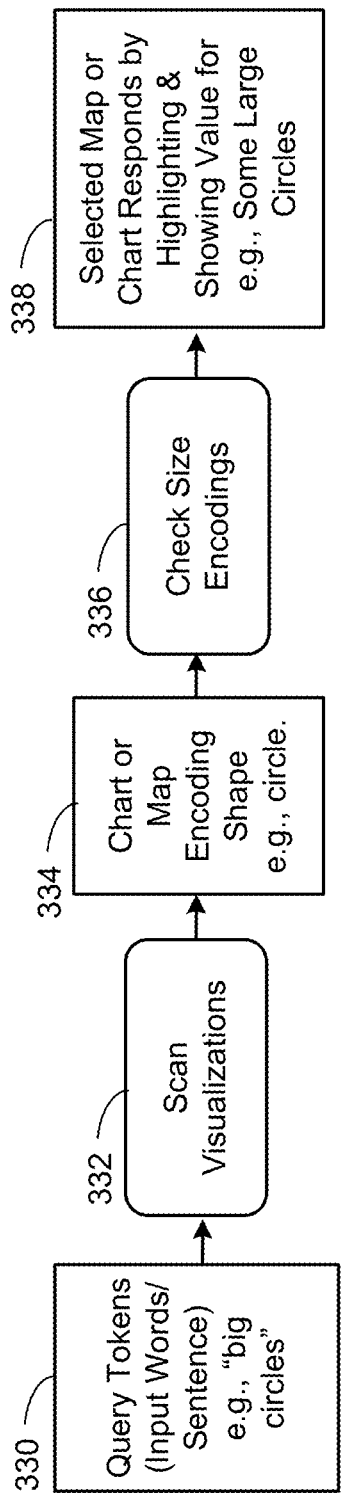
Figure 3D:
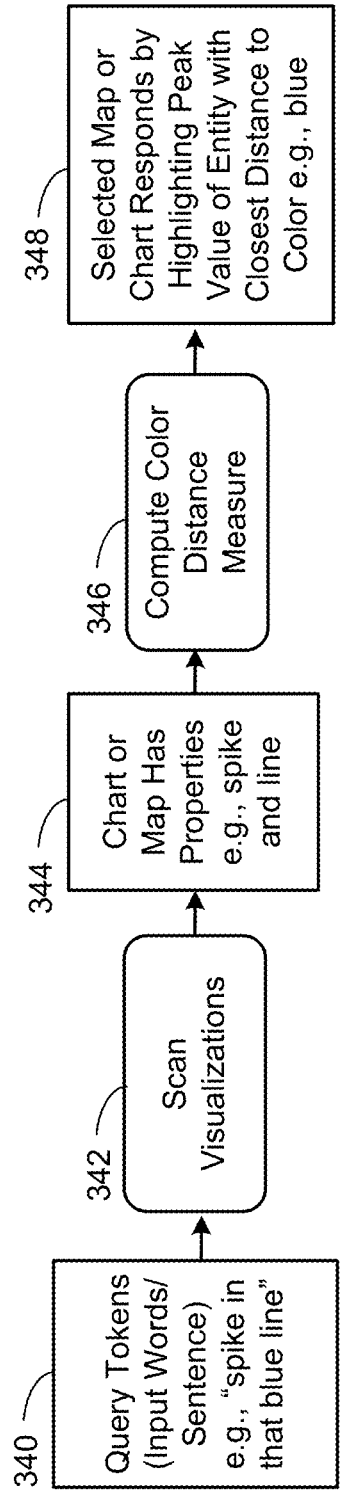

FIGS. 3A-3D are process flow diagrams illustrating processes for using natural language for visual analysis of a dataset according to some implementations. FIG. 3A illustrates a process of computing semantic and synonym relatedness of extracted analytic phrases. FIG. 3B illustrates determining analytical functions associated with the extracted analytic phrases. FIGS. 3C and 3D illustrate processes of creating functional phrases based on the computed analytical functions. In each of these figures, the process begins with a set of "query tokens," which are elements of a natural language command or question from a user. These query tokens from a user's natural language input should not be confused with a database query, which is processed by a database engine.

FIG. 3A illustrates the computation of semantically related words, according to some implementations. Queries often contain direct, clear references to particular columns of data, such as when the user types "nation" to refer to a "nation" data column. But a user may use an alternative word, such as "country" in reference to the "nation" column. In this case, natural language processing helps to compute semantically related words. In some implementations, a query token 310, such as an analytic phrase extracted from a natural language command, is input to the language processing module 238. For example, the phrase may be "country" or "temporary workers" or "big cluster." In some implementations, the language processing module 238 uses neural network models 312 to generate semantically similar words (sometimes referred to as synonyms). In some implementations, the language processing module 238 uses synonym lookup 314 to generate synonyms. Some implementations use both neural network models 312 and synonym lookup 314 to generate synonyms. Some implementations use other alternatives, such as probabilistic modeling, to derive synonyms.

In implementations that use neural network models 312, semantic and syntactic relatedness are computed by initially training a neural network on a large corpus of text (generally computed in advance). Some implementations that use neural network models produce word embeddings. A word or phrase from a vocabulary of words (which can be considered a space with a large number of dimensions) is mapped to, or embedded in, a continuous vector space of real numbers (a space with a much smaller number of dimensions). Word embeddings capture similarity between words and enable efficient computation of semantic similarity using vector arithmetic. For example, a pattern such as "boy is to girl as prince is to princess" can be generated through algebraic calculations on the vector representations of the words 'boy,' 'girl,' 'prince' and 'princess.' The algebraic expression 'prince'−'boy'+'girl' produces a result that is closest to the vector representation of 'princess,' in this example. Some implementations use the neural network models for finding semantically related words, such as in the above example. Other implementations also use the models to generate syntactically related word, such as for deriving the future tense equivalent of a given word in the present tense.

A number of neural network models can be used to generate word embeddings, such as Tomas Mikolov's Word2vec™ (further described below) and Stanford University's GloVe™. Some libraries, such as GenSim™ and Deeplearning4j™, provide a choice of different word embedding models in a single package. FIG. 3A illustrates an example using neural network model (312) called Word2vec™ described in Mikolov's "Efficient Estimation of Word Representations in Vector Space," which is hereby incorporated by reference. Word2vec implements two model architectures—continuous bag of words (CBOW) and skip-gram—for computing continuous vector representations of words (sometimes referred to as word vectors) from very large data sets. The CBOW model predicts the current word from a window of surrounding context words. The skip-gram model, on the other hand, predicts the surrounding window of context words using the current word.

The CBOW model computes the frequency of each word in a sentence, but ignores grammar and word order. For example, suppose the current word in a sentence is $w_i$ and the window size is 2. In some implementations, the inputs to the CBOW model are the words preceding the current word ($w_{i-2}$ and $w_{i-1}$), and the words following the current word ($w_{i+1}$ and $w_{i+2}$). In some implementations, a neural network based on this model will output $w_i$. In the skip-gram model, nearby context words are weighed more heavily than more distant words, so the word order matters. The Skip-gram model is an extension of single n-gram model that not only looks at the occurrence of a set of adjacent words, but also sets of words where some words are skipped in between. For example, suppose the input to the model is $w_i$. In some implementations, the output of the neural network is $w_{i-1}$, $w_{i-2}$, $w_{i+1}$, $w_{i+2}$. In some implementations, the context is not limited to the immediate context. In some implementations, the neural network is trained by skipping a constant number of words in its context. For example, some implementations use words $w_{i-2}$, $w_{i-4}$, $w_{i+3}$, and $w_{i+4}$ for training.

The CBOW and skip gram models have several configurable parameters specific to each implementation. The context window size, for example, determines how many words before and after a given word will be included as context words of the given word. Additionally, in some implementations, models are trained with negative sampling or without negative sampling, such as using hierarchical softmax and sub-sampling. The negative sampling method seeks to minimize the log-likelihood of sampled negative instances. The hierarchical softmax method, on the other hand, seeks to maximize the log-likelihood of sampled instances. The two approaches are complementary, with the hierarchical softmax performing better for infrequent words and the negative sampling yielding better results for frequent words. Some implementations use sub-sampling to increase training speed by separately sampling words with frequency above a certain threshold.

Subsequent to generating 312 word embeddings 316 as described above, some implementations use feature reduction techniques 318 to reduce the dimensionality of the solution space. Some implementations use multivariate analyses, such as Principal Components Analysis, for feature reduction. Some implementations use machine learning algorithms, such as t-distributed stochastic neighbor embedding, for embedding high-dimensional data into a space of two or three dimensions, which is then easily visualized in a scatter plot. Some implementations use clustering algorithms, such as k-means clustering and hierarchical clustering, for reducing the dimensionality from a larger dimension word vector to a lower dimension (k clusters).

FIG. 3A illustrates the use of k-means clustering to derive statistically significant similar word vector clusters from input word vectors, according to some implementations. In some implementations, after removing stop words from the input query, k clusters are initialized using the word vectors corresponding to each salient term in the input query. The initial centers of the k clusters are chosen randomly. In some implementations, each point corresponding to a respective word vector is then assigned to the nearest average based on semantic distance. The average is moved to the center of the cluster. The process is repeated until there is convergence (e.g., when the semantic distance between the new average and the old center is below a threshold value, which is a configurable parameter). The k centers represent the k clusters of words. Once the k word clusters are computed, each query word is assigned to one of the k clusters based on the semantic distance (between the word and the cluster centers). Some implementations fix the desired number of clusters k based on knowledge of the data set or by analysis of the quality of the results. Some implementations derive the number of clusters k using extrinsic techniques, such as an elbow method or X-means clustering. The result of the clustering step is that each cluster consists of semantically similar and statistically significant word vectors 319, and an input query word can be mapped to words within that cluster. In the example shown in FIG. 3A, the word "country" is mapped to semantically similar words, such as "nation," that were used to train the neural network models.

Some implementations use synonym lookup 314, such as by querying a lexical database, to find semantic equivalents or synonyms of query words. Some implementations use WordNet, a large lexical database commonly used in linguistics and text mining. In WordNet, nouns, verbs, adjectives and adverbs are grouped into sets of cognitive synonyms (synsets), each expressing a distinct concept. WordNet is described in detail at https://wordnet.princeton.edu, which is hereby incorporated by reference. WordNet provides the getSynonyms( ) API that returns the corresponding synonyms 315 for a given word.

FIG. 3B illustrates a process of identifying analytical functions in a query, according to some implementations. Some natural language queries, such as "show me the cheapest houses near Ballard," or "where are the mansions in South Lake Union," require computing the type of analytical functions associated with the query term, above and beyond computing the semantic relatedness. The query token "cheapest" requires not only the computation that the token is semantically related to "house price" in the dataset, but also the computation that the token corresponds to the bottom N percent of the "house price" (data column). Similarly, the query token "mansion" requires not only the computation that the token is semantically related to "sqft." in the dataset, but also the computation that the token corresponds to the top N percent of the "sqft" of homes in the dataset.

In some implementations, the algorithm for computing analytical functions related to query tokens 320, such as "cheapest" and "mansions" in the above examples, extends the algorithm described above in reference to FIG. 3A for computing semantic relatedness. Some implementations get (321) the corresponding definitions (word definitions 322) for the query tokens 320 using some corpora, such as dictionary.com. Some implementations then remove stem words (connecting words, for example) from the definitions 322. Some implementations compute (323) a bag of words (324) corresponding to the word definitions 322. Some implementations then check (325) if the bag of words contains adjectives, such as "less," "more," and "high." Some implementations use APIs provided by natural language toolkit libraries, such as WordNet's part-of-speech API, to check for the presence of these adjectives. When the bag of words 324 does contain relevant adjectives 326, some implementations map the adjectives to one or more analytical functions. For example, "most" is mapped to Top-N, "low" is mapped to Bottom-N, and "average" is mapped to mean, and so on. Analytic functions specify an objective measure corresponding to an analytic concept.

FIGS. 3C and 3D illustrate processes of evaluating user input that refers to properties of a displayed data visualization, such as shapes, colors, and/or marks, according to some implementations. A dashboard, (e.g., as illustrated in FIG. 4J) contains multiple data visualizations (each of which is sometimes referred to as a "view" or a "viz"). One objective is to correlate the tokens in the user input to a specific data visualization. For example, a user may enter "what are the values of those big circles." The data visualization application (or the language processing module 238) scans (332) the data visualizations. In some instances, one or more charts or maps that have the shape ("circle") are extracted as a result 334 of the scanning 332. For example, a map and a scatterplot may both have circles (e.g., having circle data marks or having multiple data marks arranged so that they look like a circle when viewed together). In some implementations, the selected maps or charts are further scanned or checked (336) for size encoding (e.g., "big") of the given shapes ("circles" in this example). In some implementations, the language processing module 238 highlights the viz (e.g., a chart, a map, or a scatterplot) and shows the values for the shapes (338), such as by showing values for some large circles. FIG. 3D illustrates the case where a query token refers to a portion of a visualization by color and shape. In the example illustrated, the user queries (340) with the phrase "what's the spike in that blue line." If more than one view encodes the blue color, some implementations scan (342) the visualizations to determine which chart or map has (344) both of the properties or shapes (both a "spike" and a "line" in this example). In some implementations, the language processing module 238 then computes (346) a color distance measure. To continue the example, the language processing module 238 determines that among the colors used in the line chart, the color value for the data value "townhouse" in the dataset has the closest distance to the "blue" color and highlights (348) the peak value for the data value "townhouse."

FIGS. 4A-4K illustrate graphical user interfaces for interactive data analysis using natural language processing in a data visualization application according to some implementations. One way to appreciate FIGS. 4A-4K is to view them as a series of data visualizations, each figure representing a data visualization based on the previous figure. Natural language processing allows users to communicate naturally with a computing device (e.g., a computing device 200) in order to explore the data (e.g., communicate via a microphone of the computing device and/or via text). The computing device analyzes commands (also referred to as queries, natural language questions, or natural language commands) received from the user to determine a meaning of the command (e.g., determine a relationship between the command and the data set). In this way, the user is not restricted to a regimented set of commands. Instead, the user may pose informal questions related to the data visualization, which may be interpreted by the computing device on the fly. For example, a command may vaguely state "show me when it's hot" and the computing device highlights portions of an existing data visualization (e.g., a data visualization showing temperatures across California in 2015, where temperatures are above a certain threshold).

Figure 4A:
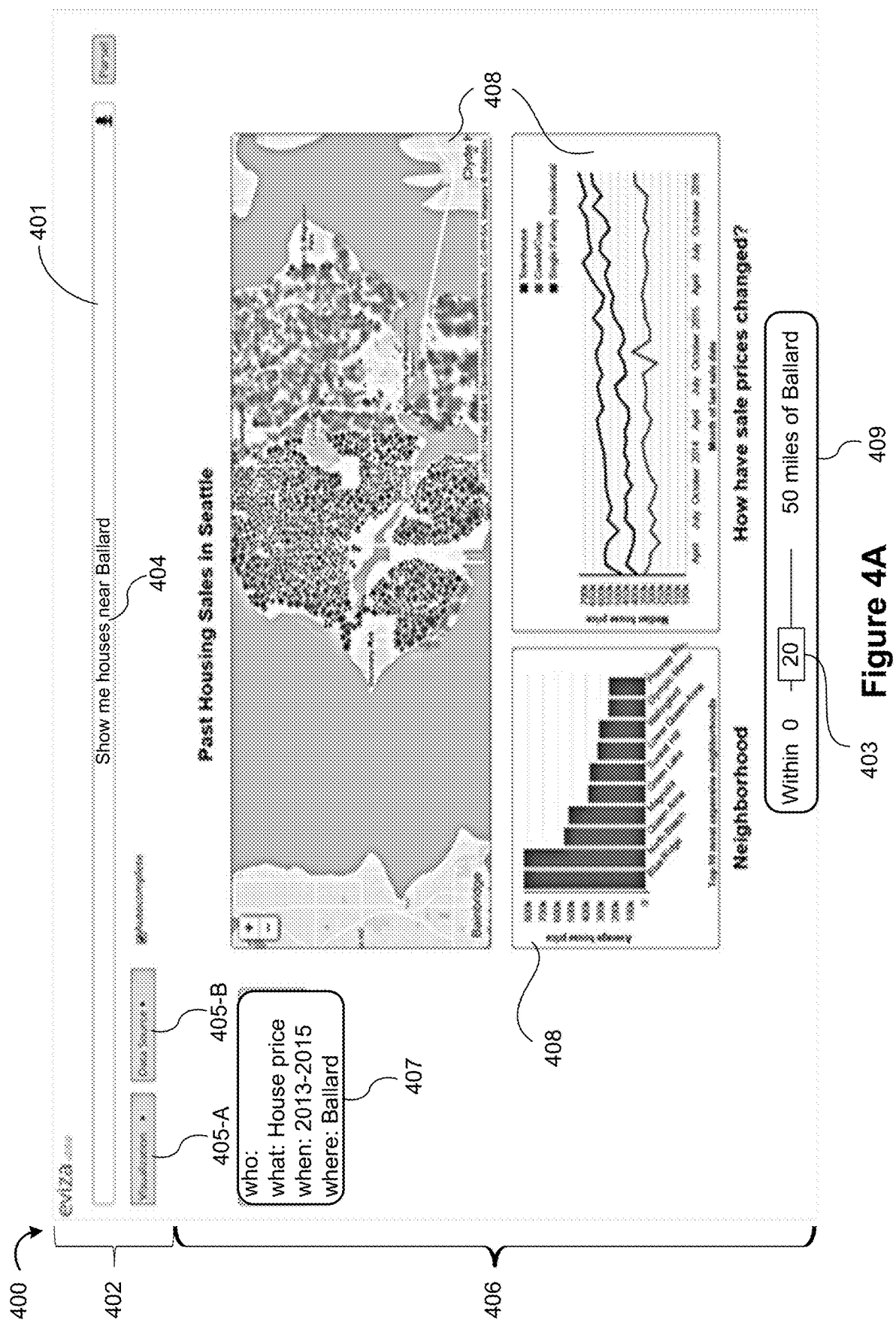
FIGS. 4A-4K illustrate graphical user interfaces for interactive data analysis using natural language processing in a data visualization application according to some implementations.

Referring to FIG. 4A, the graphical user interface 400 includes a natural language processing region 402. The natural language processing region 402 is an example of the natural language processing region 124 in FIG. 1. In some implementations, a user interacts with a command bar 401 (also referred to herein as an input bar) in the natural language processing region 402 to provide a command, as discussed above in FIG. 1. In addition, in some implementations, the natural language processing region 402 includes one or more drop-down menus (e.g., drop-down menus 405-A and 405-B), which enable the user to choose a visualization type (e.g., map, line chart, bar chart, or scatter plot) and a data source (e.g., select a first dataset and a second dataset).

In some implementations, the graphical user interface 400 also includes a data visualization region 406. The data visualization region 406 is an example of the data visualization region 112 illustrated in FIG. 1. As shown, the data visualization region 406 includes an area for displaying one or more data visualizations 408. For brevity, the one or more data visualizations are also referred to collectively as a data visualization, a displayed data visualization, or a dashboard. In some implementations, the data visualization region 406 includes an information pane 407, which includes information about the data visualization 408. For example, the information pane 407 in FIG. 4A includes "what: House price," "when:2013-2015," and "where: Ballard." As shown in FIG. 4A, in some implementations, a plurality of distinct data visualizations 408 is displayed in the data visualization region 406, depending on inputs received from the user.

To create a data visualization 408, a user may associate one or more data elements (also referred to as attributes, data fields, or simply, fields) from a schema information region (e.g., the schema information region 110 in FIG. 1) with one or more shelves in the data visualization region 406 (e.g., the column shelf 120 and the row shelf 122). In response to receiving the user associations, the application 230 queries the database using a set of queries corresponding to the received user associations, and then displays one or more data visualizations 408 in the data visualization region 406 using the data retrieved (e.g., the X-axis is associated with a first field in the column shelf 120 and the Y-axis is associated with a second field in the row shelf 122). Although not shown, in some implementations, the graphical user interface 400 in FIG. 4A is integrated with the graphical user interface 100 in FIG. 1.

In some implementations, after displaying the data visualization 408, the application 230 processes additional commands received in the natural language processing region 402. For example, the user may input one or more commands (e.g., queries) related to the displayed data visualization 408. The application 230, upon receiving the one or more commands from the user, requeries the database using an updated set of queries corresponding to the received commands and updates the displayed data visualization 408 (e.g., filters the data, adds data fields, highlights specific data marks, or inserts statistical tools) using the data retrieved. In some instances, requerying the database is performed locally at the computing device using cached or stored data at the computing device. For example, requerying is commonly performed locally when the natural language command specifies one or more filters. In some implementations, requerying the database is performed remotely by accessing computers across one or more networks.

As previously noted in reference to FIGS. 3A-3D, natural language commonly includes ambiguity, which comes in various forms. For example, a command may include a syntactic ambiguity, which involves syntactic differences between a command and the data set (e.g., spelling, plurality variations, or abbreviations). A command may include a semantic ambiguity. A semantic ambiguity concerns differences in semantic alignment between the command and data fields of the underlying analytical functions in the data visualization. To resolve the semantic ambiguity, some implementations use the language processing module 238 to extract key words and/or analytic phrases from the command, compute semantic relatedness (described above with reference to FIG. 3A), compute analytical functions associated with the extracted analytic phrases creating functional phrases (described above with reference to FIG. 3B), and then compare those key words or phrases with one or more data fields in the dataset. In some implementations, a phrase with semantic ambiguity is translated into a parameterized data selection criterion, which includes both a data field from the data set and one or more parameter values to define a range.

Referring to FIG. 4A, the displayed data visualization 408 concerns housing sales in Seattle between years 2013 and 2015. The information pane 407 identifies what data is included in the data visualization 408. The user has typed the command "Show me houses near Ballard" 404 in the command bar 401 (or speaks the command). Upon receiving the command, the language processing module 238 determines that "near" does not semantically align with attributes of the displayed data visualizations 408. Consequently, the language processing module 238 resolves the semantic ambiguity by mapping "near" to at least one data field in the data set to form a parameterized data selection criterion.

In some implementations, the language processing module 238 determines semantic relatedness metrics between the ambiguous words/phrases in the command 404 and respective data fields in the dataset using techniques discussed earlier with reference to FIG. 3A. For example, the language module 238 determines a relatedness metric between "near" and a data field (e.g., "Neighborhood") in the dataset. In some implementations, when the relatedness metric for a particular data field is sufficiently high (e.g., exceeds a predefined relatedness threshold and/or is greater than the relatedness metric for the other data fields in the data set), the language module 238 maps the ambiguous word/phrase to the particular data field. Having determined that "near" relates to the data field "Neighborhood" in the data set, the language module 238 also needs to specify a parameter value to determine what is "near." This is described in more detail below. In some implementations, a token such as "near" is related to a combination of two or more data fields, such as the combination of longitude and latitude.

In some implementations, the language module 238 categorizes components of the command 404 to aid in determining relatedness between two words. For example, "near Ballard" may be categorized as a "spatial" descriptor. Once categorized, the language module 238 compares attributes and word(s)/phrase(s) from the command that fall within the same category. For example, "Neighborhood" may also be considered a spatial descriptor, and therefore "neighborhood" is compared with "near Ballard" because both words/phrases fall within the same category.

As noted above, the term "near" is ambiguous. In some implementations, to address this type of ambiguity, the language module 238 estimates one or more initial parameter values for the ambiguous term based on the displayed data visualization (or the dataset more generally). For example, after the term "near Ballard" is mapped to "Neighborhood," the language module 238 makes an estimate for what is considered a "near" Ballard based, at least in part, on the displayed data visualization.

In some implementations, to make the estimate, the language module 238 evaluates the distribution of data values of the data field associated with the ambiguous term. For example, the language module 238 may calculate one or more statistics for the data element associated with the ambiguous term (e.g., distance between neighborhoods in Seattle). The one or more statistics may be, for example, a mean associated with the data element (e.g., a mean distance between neighborhoods in Seattle), a mode associated with the data element (e.g., a mode distance between neighborhoods in Seattle), a median associated with the data element (e.g., a medium distance between neighborhoods in Seattle), a standard deviation associated with the data element (e.g., a standard deviation of distance between neighborhoods in Seattle), and/or a percentile associated with the data element (e.g., a percentile of distance between neighborhoods in Seattle).

Alternatively, or in addition to the one or more statistics, some implementations access one or more third-party servers (or services) to make the estimate. For example, the language module 238 may query a third-party server for "what is considered near a neighborhood." After receiving a response from the third-party server, the language module 238 updates the data visualization in accordance with the response (or in combination with the one or more statistics).

In some implementations, the parameterized data selection criterion is displayed visually in the data visualization region 406 as a user control interface 409 (also referred to as an ambiguity widget or an editable user interface control). The user can then update the parameter value using a control 403. In some implementations, the data visualization updates in real-time (or nearly real-time) as the parameter is adjusted. In some implementations, the language module 238 generates the user control interface 409 in response to determining that the command includes one or more ambiguities. The user control interface 409 is typically associated with a data field (e.g., "distance"). In some implementations, initial values (e.g., range or starting position) for parameters associated with user control interface 409 use the estimates described above. For example, the starting value (e.g., 20) is the estimate the language module 238 made for what is considered to be "near" a neighborhood. The user control interface 409 includes one or more affordances to edit the parameter value(s). In some implementations, the affordance is one or more buttons (not shown). In some implementations, the affordance is a slider bar (e.g., a slider bar 403 as illustrated in FIG. 4A). In some implementations, the affordance is a drop-down menu (not shown).

In some implementations, a user interacts with the affordance 403 of the user control interface 409 to modify the data visualization 408. For example, the user may interact with the affordance 403 (e.g., click or touch) by adjusting (e.g., sliding) the affordance 403 from a first position (or a first value) to a second position (or a second value). The data visualization 408 after modification is not illustrated.

Figure 4B:
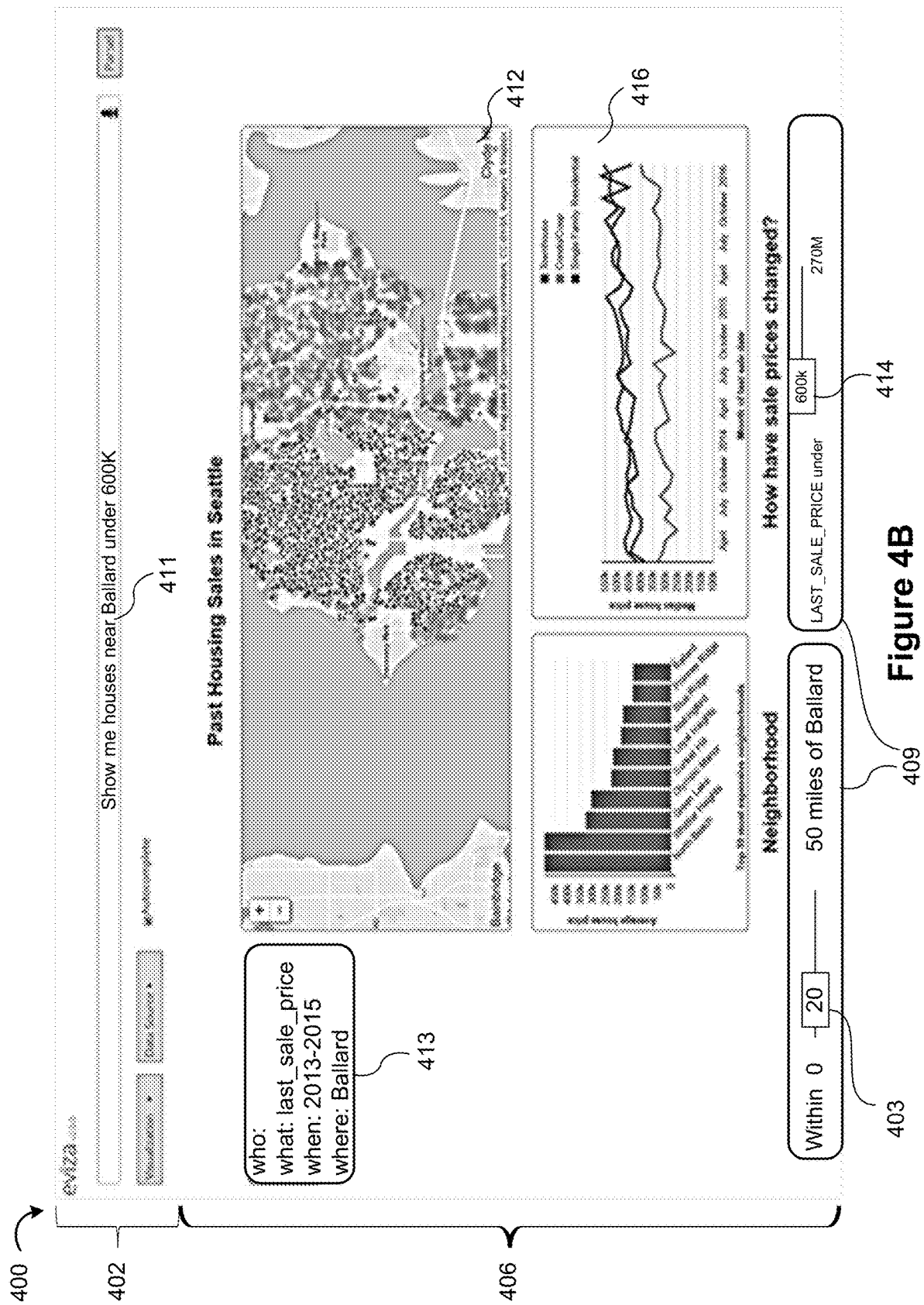

FIG. 4B shows an updated version of the data visualization 412 in view of the command "Show me houses near Ballard under 600K" 411 received from the user. The language processing module 238 estimates the 20-mile radius (around Ballard) based on techniques discussed above. Even though the phrase "600K" is reasonably understood as a price condition by a human, it is ambiguous for a computer. In some implementations, a parser (not shown) in the language module 238 recognizes unit and price formats, such as K, M, and million, and converts the "K" to an appropriate numerical value (600,000 in this example). Thereafter, in some implementations, the language module 238 computes the semantic relatedness of the extracted phrase "$600,000" using techniques discussed previously with reference to FIG. 3A. In some implementations, the language module 238 generates word embeddings (312) for each of the query words "houses," "under" and "$600,000." The word embeddings (word vectors in some implementations) are each assigned to a word cluster using a feature reduction algorithm (318), such as k-means clustering, according to some implementations. In some implementations, each cluster corresponds to a group of words, and the cluster to which a particular query word is assigned to predicts the data field or a set of data fields in the data visualization. The query word "600K" is thereby calculated to be semantically related to "sale price" (e.g., from the chart 416) that corresponds to the "last_sale_price" data field in the dataset.

For this example, the computed semantically related phrase is sufficient to disambiguate the input query. Some implementations tag the resultant phrases as the set of resultant functional phrases. In some implementations, the computer requeries the database based on the created functional phrases retrieving an updated dataset. The updated data visualization 412 displays housing sales within 20 miles of Ballard with sale prices under $600,000. As in FIG. 4A, in some implementations, the user interface control 409 includes an affordance (slider bar 403) in the updated data visualization region 406 because the distance (nearness to Ballard) is a parameterized data selection criterion. Additionally, the last_sale_price data field is also displayed as an affordance (by the slider bar 414) as part of the user interface control 409. As previously described, any user modification of the parameters is reflected in subsequent displays (not shown). In some implementations, the information pane 413 in the data visualization region 406 includes information about the data visualization 412. For example, the information pane 413 in FIG. 4B includes "what: last_sale_price," "when:2013-2015," and "where: Ballard."

Figure 4C:
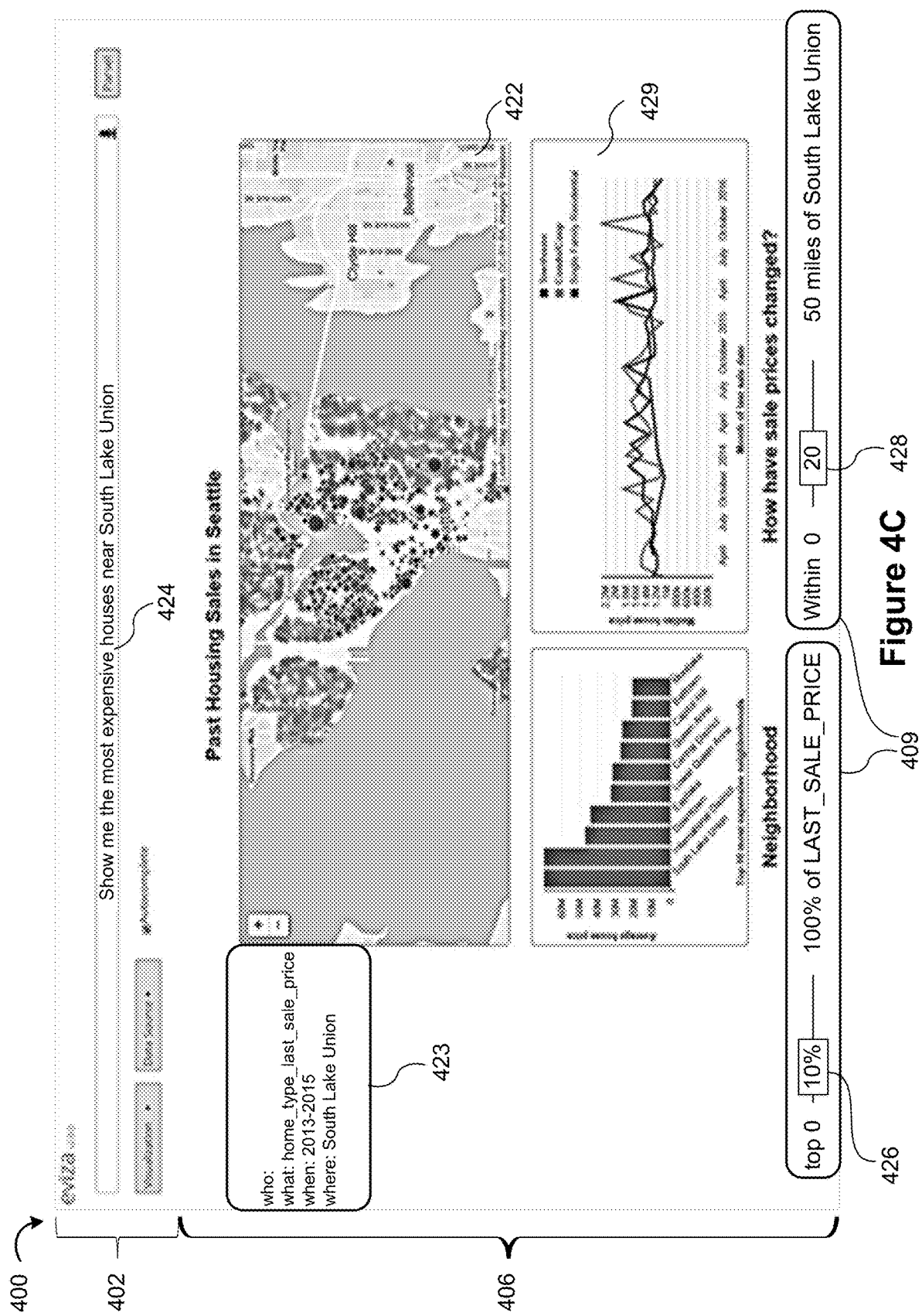

FIG. 4C shows an updated version of the data visualization 422 in view of the command "Show me the most expensive houses near South Lake Union" 424 received from the user. Similar to FIGS. 4A and 4B, the language processing module 238 estimates a 20-mile radius (around South Lake Union) based on techniques discussed above, in response to the phrase "near South Lake Union." This is illustrated by the slider 428. The phrase "most expensive houses" is ambiguous, however. The language module 238 computes the semantic relatedness of the extracted phrase "expensive houses" using techniques discussed previously with reference to FIG. 3A, and described in reference to FIG. 4B above. The query phrase "expensive houses" is calculated to be semantically related to "sale price" (e.g., from the chart 429) that corresponds to the "last_sale_price" data field in the dataset.

In this case, unlike FIG. 4B described above, the computed semantically related phrase is insufficient to disambiguate the input query "most expensive houses." In particular, the query token "most" requires further disambiguation. The language processing module 238 identifies analytical functions using techniques described above with reference to FIG. 3B. In some instances, the language processing module 238 can skip the steps 321 (getting definitions from a dictionary) and 323 (computing a bag of words), and can directly use a publicly available natural language toolkit library API, such as the WordNet's part-of-speech API, similar to step 325 in FIG. 3C, to check if the word is an adjective. Since the word token "most" corresponds to an adjective that relates to quantity, degree, amount, measure, or number, the language processing module 238 maps (327) the adjective to an analytical function using a mapping technique, such as using a lookup table (not shown). In the example illustrated in FIG. 4C, the language model maps "most" to the top 10 percent of last_sale_price. Additionally, the last_sale_price data field is also displayed as an affordance (e.g., a slider bar 426) as part of the user interface control 409, according to some implementations. As previously described, any user modification of the parameters is reflected in subsequent displays (not shown). In some implementations, the information pane 423 in the data visualization region 406 includes information about the data visualization 422. For example, the information pane 423 in FIG. 4C includes "what: home type_last_sale_price," "when:2013-2015," and "where: South Lake Union."

Even though a user command may consist of multiple sentences, the computer may display, in the command bar 401, and respond to, only the last sentence. In some implementations, the command bar 401 displays the entire user command but processes (using the language processing module 238) only a subset of the sentences. Some implementations display the entire command and process the entire command. For example, suppose the user said "I've heard that South Lake Union is one of the most expensive neighborhoods. Show me the most expensive houses near South Lake Union." In some implementations, the language processing module 238 ignores the first sentence (e.g., because it is not actionable) and displays, as illustrated in FIG. 4C, only the last sentence "Show me the most expensive houses near South Lake Union." The language processing module 238 then processes only that last sentence.

Figure 4D:
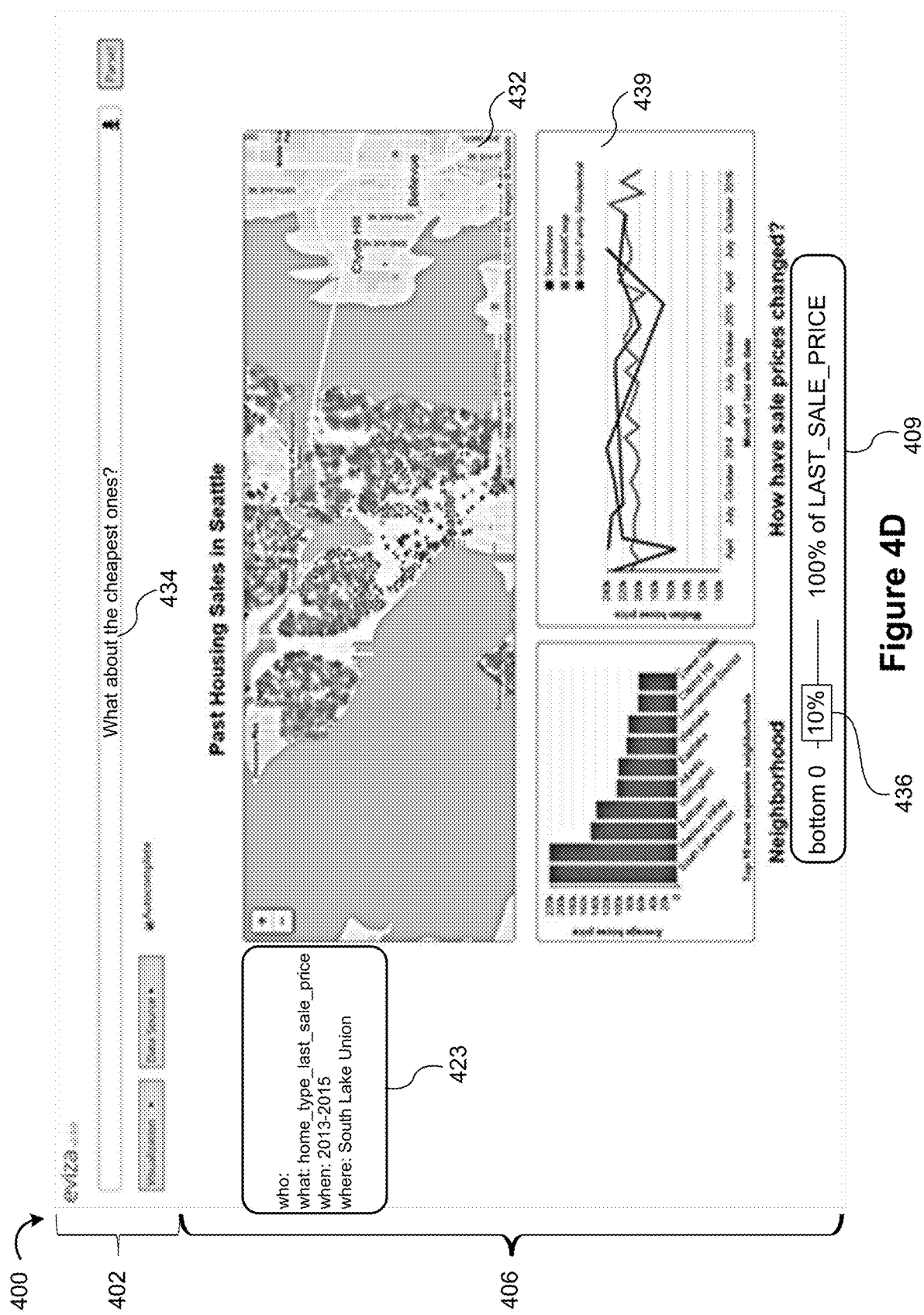

FIG. 4D shows an updated version of the data visualization 432 based on the command "What about the cheapest ones?" 434 received from the user. In some implementations, the computer identifies that the user has made no change to the location and retains the location from the last data visualization (shown in FIG. 4C as South Lake Union in the information pane 423). In some implementations, the language module 238 computes the semantic relatedness of the extracted phrase "cheapest ones" using techniques discussed previously with reference to FIG. 3A, and described in reference to FIGS. 4B and 4C above. In some implementations, the query phrase "cheapest ones" is calculated to be semantically related to "last_sale_price" (e.g., from the chart 439) that corresponds to the "last_sale_price" data field in the dataset. The computed semantically related phrase is insufficient to disambiguate the input query "cheapest ones." The example token "cheapest" was used in the description of FIG. 3B above and is not repeated here for brevity. The language processing module 238 identifies the analytical function (for example, the bottom 10 percent of house prices) using techniques described above in reference to FIG. 3B, according to some implementations. In some implementations, the last_sale_price data field is displayed as an affordance (e.g., the slider bar 436) as part of the user interface control 409. In some implementations, the information pane 423 in the data visualization region 406 includes information about the data visualization 432. For example, in FIG. 4D, the information pane 423 remains intact with no change (relative to FIG. 4C).

Figure 4E:
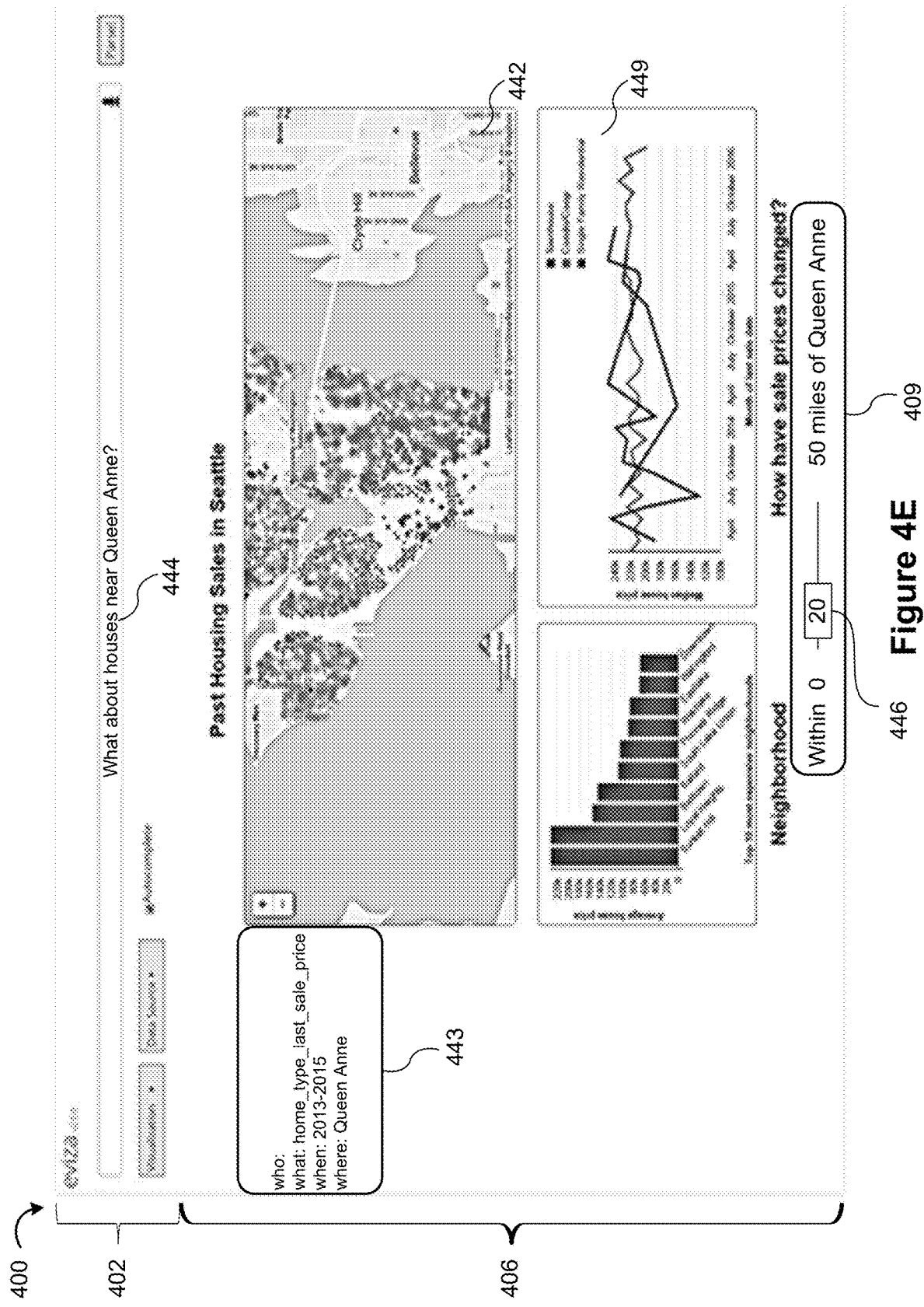

FIG. 4E shows an updated version of the data visualization 442 in view of the command "What about houses near Queen Anne?" 444 received from the user. In some implementations, the computer identifies that the user has made a change to the location (from South Lake Union in FIG. 4D to Queen Anne here). In some implementations, the computer updates the information pane 443. For this example, the language module 238 behavior tracks the description in FIG. 4A. Additionally, the language processing module 238 determines that "What about houses" is also semantically related to the data field last_sale_price, as in FIG. 4A, even though the user used a different phrase ("What about houses" instead of "Show me houses"). In some implementations, the user interface control 409 is updated with a slider affordance 446 to specify nearness.

Figure 4F:
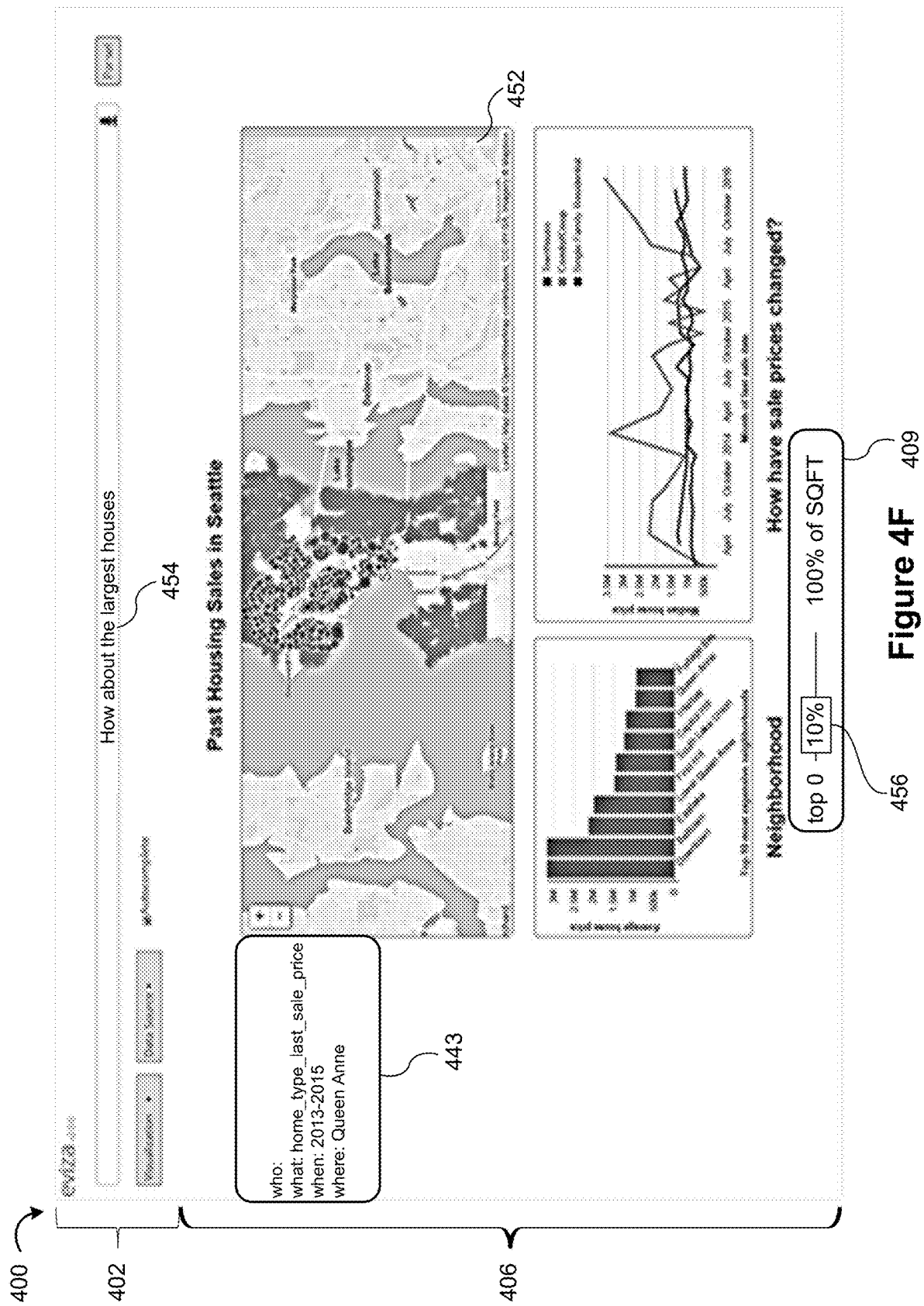

FIG. 4F shows an updated version of the data visualization 452 in view of the command "How about the largest houses" 454 received from the user. FIG. 4F is similar to FIG. 4D, but the user has used the colloquial phrase "How about." In some implementations, the language processing module 238 behaves similarly to the description above with reference to FIG. 4D. As discussed above for FIG. 4E, the language processing module 238 yields similar results for the phrases "How about" and "What about." Additionally, the language processing module 238 computes the semantically related phrases for the token "largest" and the corresponding analytical function ("Top 10% of Sqft" as shown by the slider affordance 456). In some implementations, the data visualization region 452 is reflected to display the largest houses (top 10% in this example) near Queen Anne (the location information in the pane 443 is unchanged from FIG. 4E).

Figure 4G:
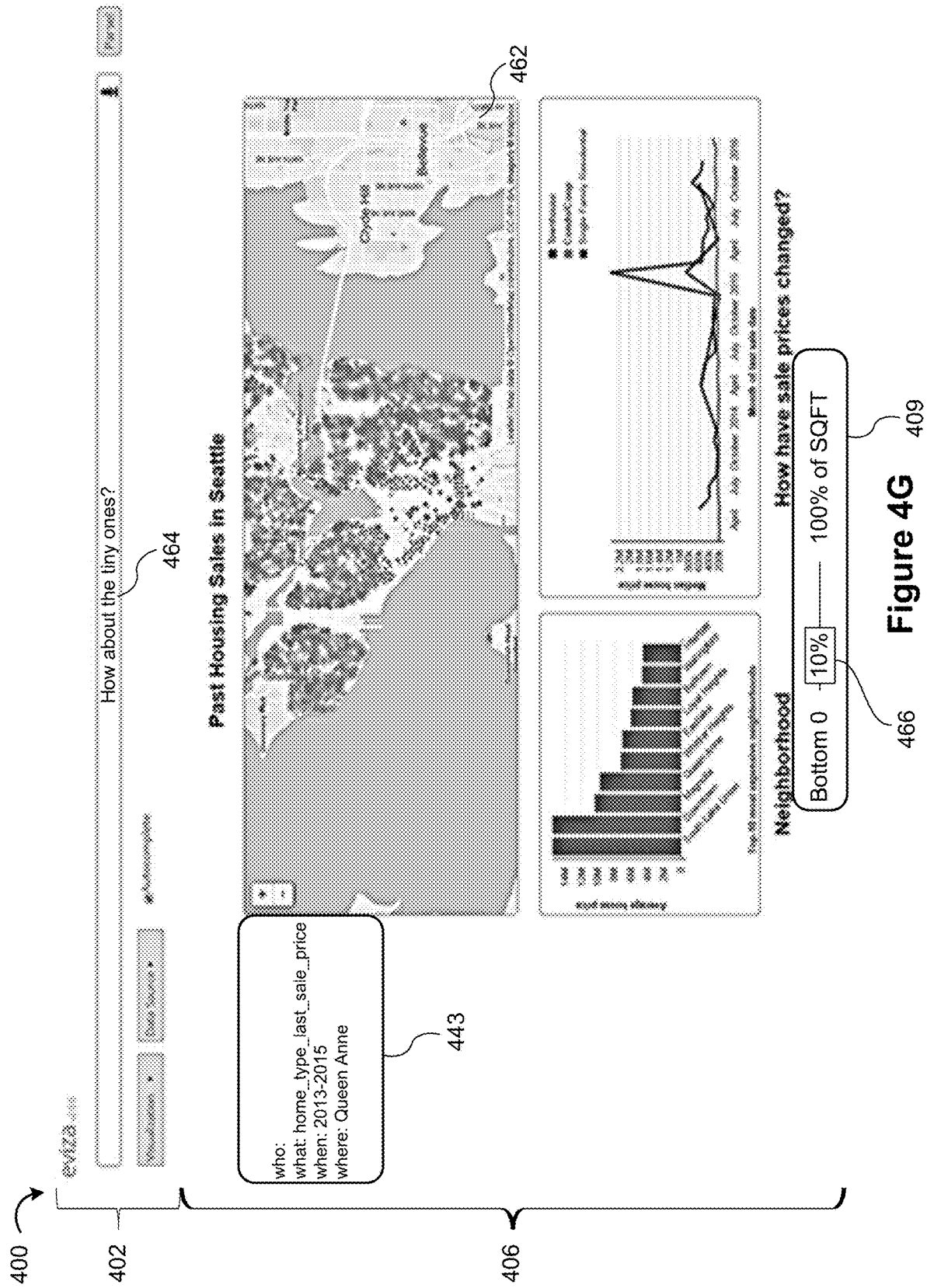

FIG. 4G shows an updated version of the data visualization 462 in view of the command "How about the tiny ones"

464 received from the user. The tokens "tiny" and "ones" each provide a context for the other. In some implementations, the language processing module 238 determines that the token "ones" is semantically related to houses using techniques described above with reference to FIG. 3A. In some implementations, the language processing module 238 also computes the semantic relatedness of the token "tiny" to the data field "Sqft" (unit for area of houses). The word "tiny," similar to the word "largest" in FIG. 4F, requires further identification of an analytical function. In some implementations, the language processing module 238 determines that the relevant analytical function is "Bottom-N." The user has not signaled a change in location with the query, so the location (Queen Anne) in the information pane 443 is left unchanged. In some implementations, the data visualization region 462 is reflected to display the smallest houses (bottom 10% in terms of Sqft area). In some implementations, the user interface control 409 is updated with a slider affordance 466.

Figure 4H:
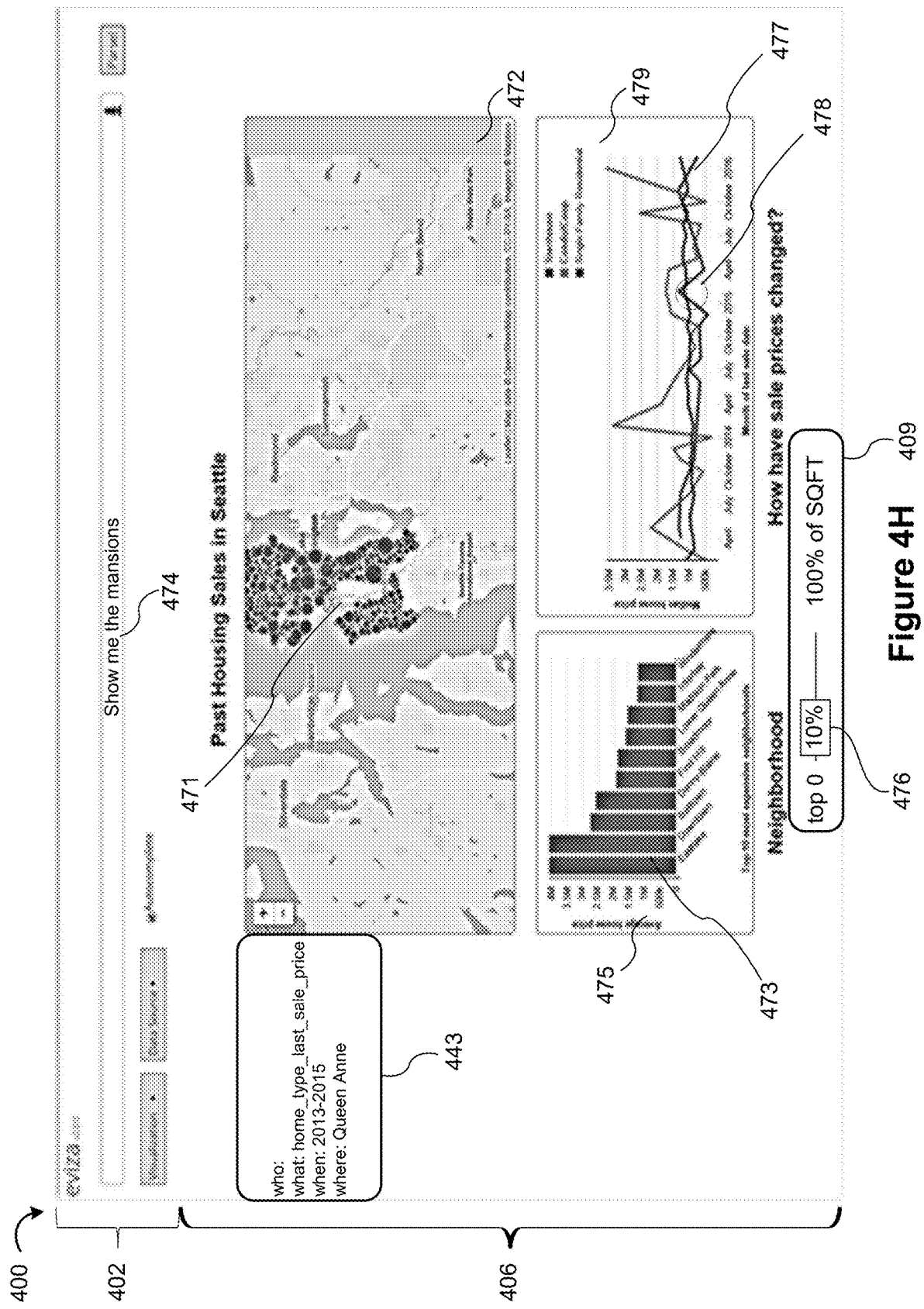

FIG. 4H is another illustration that shows an updated version of the data visualization 472 in view of the command "Show me the mansions" 474 received from the user. The query token "mansions" requires not only the computation of semantic relatedness but also the identification of an analytical function. This example was described above in reference to FIG. 3B. The language processing module 238 derives the analytical function "Top-N." The user has not signaled a change in location with the query, so the location (Queen Anne) in the information pane 443 is left unchanged, according to some implementations. In some implementations, the data visualization region 472 is reflected to display the largest houses (top 10% in terms of Sqft area). In some implementations, the user interface control 409 is updated with a slider affordance 476.

Figure 4I:
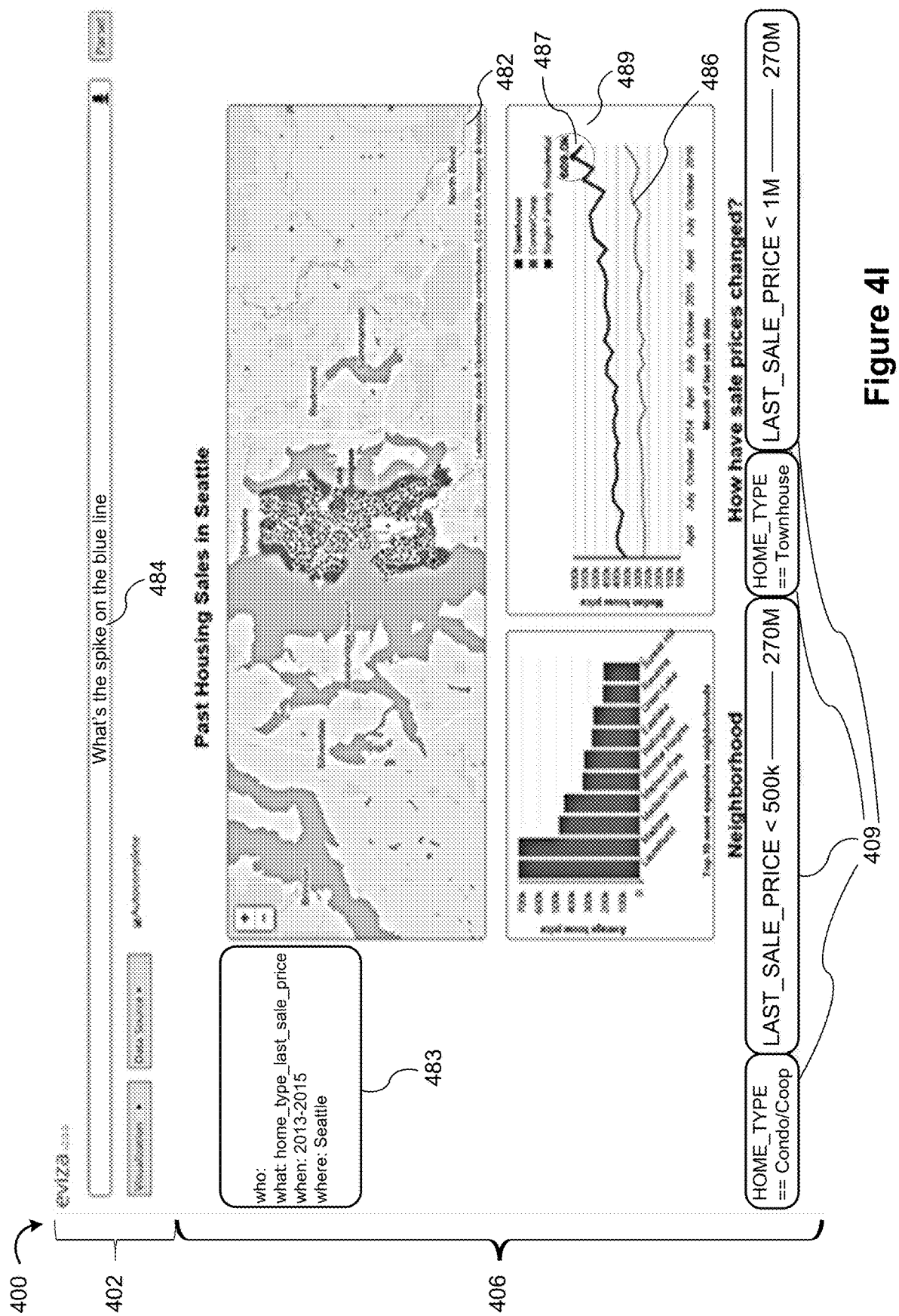
Figure 4J:
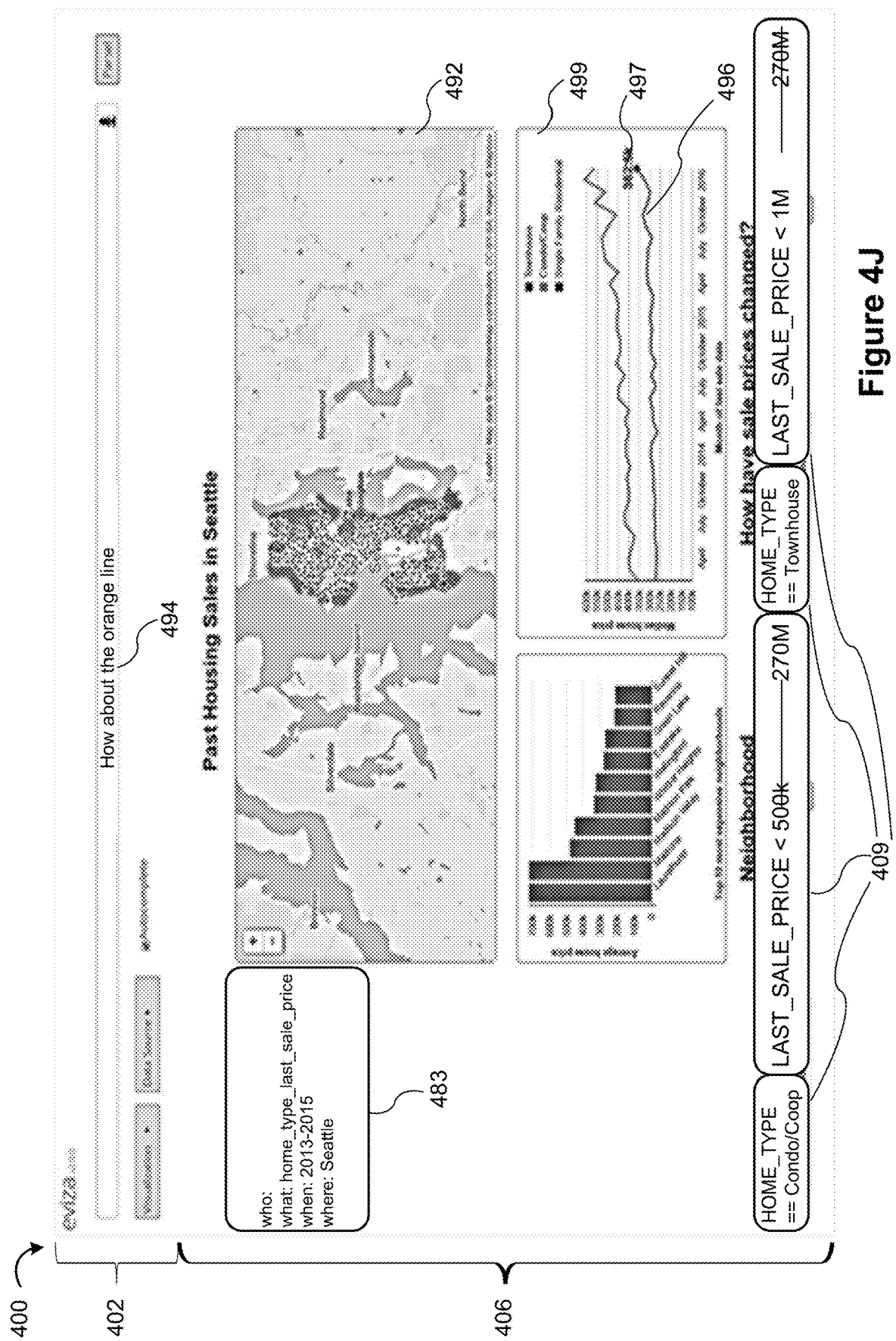
Figure 4K:
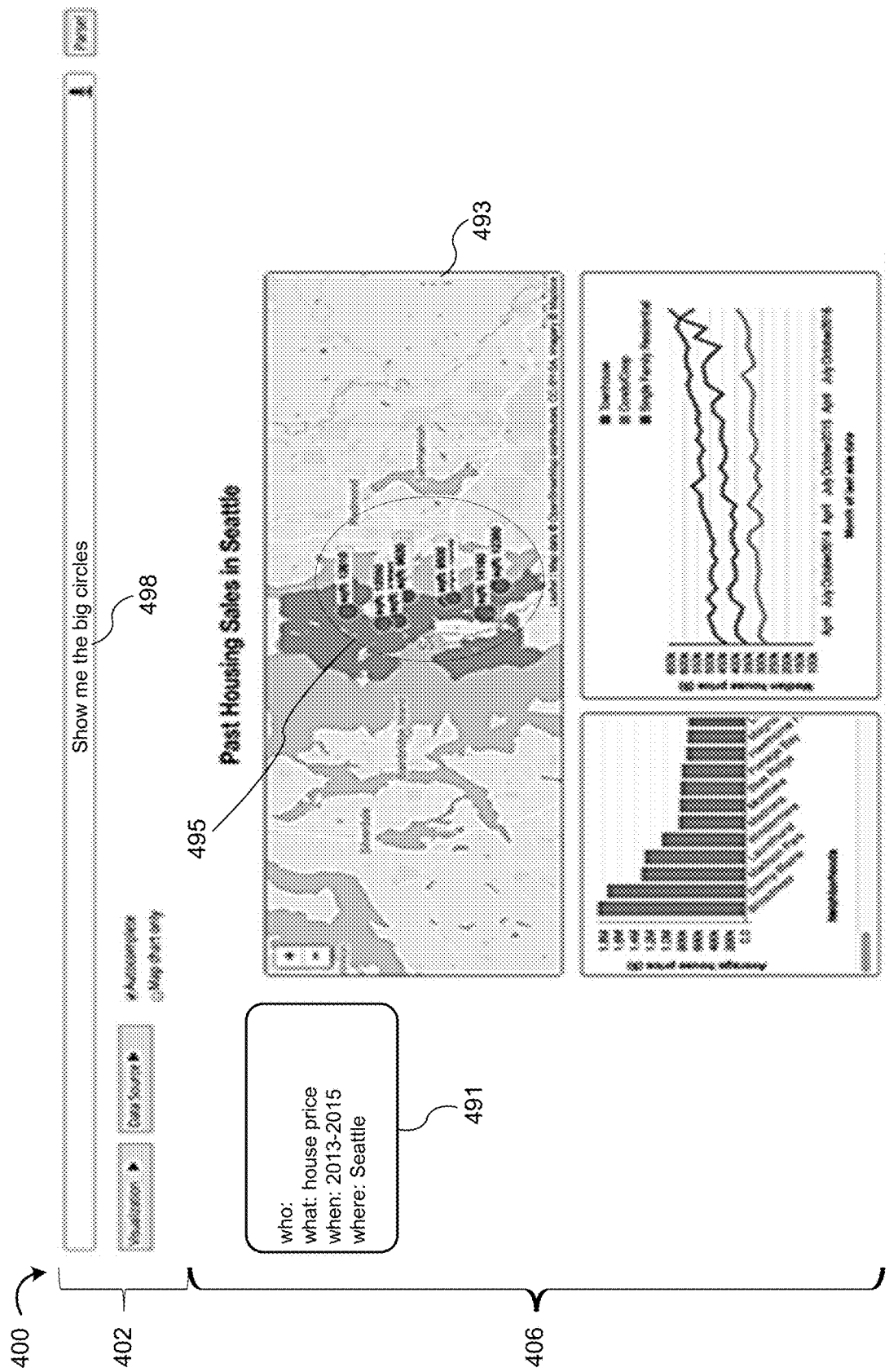

FIGS. 4I-4K illustrate support for queries referring to visual properties of a displayed data visualization. FIG. 4H is used as a reference starting point for describing FIG. 4I. In some implementations, the language processing module 238 uses techniques described in reference to FIGS. 3C and 3D above to handle such queries. FIG. 4I illustrates a data visualization 482 in response to the command "What's the spike on the blue line" 484 received from the user. FIG. 4H shows the state of the data visualization before the user issues the new command 484. In some implementations, the phrase "blue line" causes the computer to scan the different charts, and identify the charts that have blue colors. In this example, as illustrated in FIG. 4H, the map chart 472, the bar chart 473, and the line chart 479 constitute different charts in the data visualization region 406. The region 471 in the map chart 472, the bars 475 in the bar chart 473, and the line 477 in the line chart 479 are all drawn or encoded using blue color (shown as darker black color in the black and white rendering of FIG. 4H). Since each chart has a blue color, the language module 238 uses the phrase "blue line" to disambiguate. The computer identifies the line chart 479 as the relevant data visualization because the line chart data visualization uses line marks. In particular, the line 477 is the line drawn using blue color, so the computer chooses the blue line. In some implementations, in response to the token "spike," the computer scans the line 477 to find a "spike," and identifies the spike 478 (circled for the sake of illustration). In some implementations, the computer first scans for the shapes "line" and "spike," in any order, then computes the color distance measure, as shown in FIG. 3D described above, to identify the data fields the query phrase is referring to.

In some implementations, the language processing module 238 computes that the token "spike" is semantically related to peak values of the concerned data field. In some implementations, the language processing module 238 identifies the data fields and data values corresponding to the home type "Townhouse" and the last_sale_price. In some implementations, the computer also identifies the peak value of the last_sale_price data field illustrated by the circle 487 in FIG. 4I. As shown in FIG. 4I, the information pane 483 (which has been changed to Seattle) and the user interface control 409 (note new affordances) are updated as illustrated by FIG. 4I. In some implementations, the computer identifies a set of related additional data fields. For example, in FIG. 4I, the computer also identifies home type "Condo/Coop" as a related data value (related because of similar time and Sqft or area), and the user interface control 409 is updated with these affordances.

To further illustrate, FIG. 4J shows an updated version of the data visualization 492 in view of the command "How about the orange line" 494 received from the user, according to some implementations. Referring back to FIG. 4I as the initial state before the user command 494, the line chart 489 has an orange line 486 (shown in lighter color). In some implementations, the computer scans the charts and identifies the line chart 489 and the orange line 486 using techniques described above in reference to FIG. 3D (as also discussed above in reference to FIG. 4I). In some implementations, the computer highlights the line chart 499 and displays the value 497 corresponding to the data field for the orange line 496. In some implementations, the information pane 483 and the user interface control 409 remain unchanged from FIG. 4I.

FIG. 4K is an example illustrating an application of the techniques described above in reference to FIG. 3C. FIG. 4K shows an updated version of the data visualization 493 in view of the command "Show me the big circles" 498 received from the user, according to some implementations. As this example illustrates, the computer allows a user to ask more semantically rich questions using common colloquial language when referring to visualizations. The user command can refer to or ask questions about properties in any of the displayed visualizations. For example, the focus of FIG. 4J was on the line chart 499. Upon receiving the command 498, the computer shifts focus, in FIG. 4K, to the map chart 493. In some implementations, the computer highlights large homes (with big circles 495) on the map (the chart 493), which is the only viz with circular marks. In some implementations, the information pane 491 is updated to show "what: house price," but the location is unchanged from FIG. 4I. The visualization control 409 is absent, in response to the command.

FIGS. 5A-5G provide a flow diagram illustrating a method 500 of using (502) natural language for visual analysis of a dataset according to some implementations. The steps of the method 500 may be performed by a computer (e.g., a computing device 200). In some implementations, the computer includes (504) a display, one or more processors, and memory. FIGS. 5A-5G correspond to instructions stored in a computer memory or computer-readable storage medium (e.g., the memory 206 of the computing device 200). The memory stores (506) one or more programs configured for execution by the one or more processors (e.g., the processor(s) 202). For example, the operations of the method 500 are performed, at least in part, by a data visualization generation module 234 and/or a language processing module 238.

In some implementations, the computer displays (508) a data visualization based on a dataset retrieved from a database using a set of one or more queries. For example, referring to FIG. 1, a user may associate one or more data fields from a schema information region 110 with one or more shelves (e.g., the column shelf 120 and the row shelf 122, FIG. 1) in the data visualization region 112. In response to receiving the user associations, in some implementations, the computer retrieves data for the data fields from the dataset using a set of one or more queries and then displays a data visualization (e.g., the data visualization 408) in the data visualization region 112 that corresponds to the received user inputs. Displaying data visualizations is discussed in further detail above with reference to FIGS. 1 and 3A.

The computer receives (510) a user input to specify a natural language command related to the displayed data visualization. In some implementations, the user input is received as text input (e.g., a via keyboard 216 or via touch sensitive display 214) from a user in a data-entry region (e.g., a natural language processing region 402) on the display in proximity to the displayed data visualization. In some implementations, the user input is received as a voice command using a microphone (e.g., an audio input device 220) coupled to the computer. For example, referring to FIG. 4A, the displayed data visualization 408 concerns housing sales near Ballard, Seattle between the years 2013 and 2015. Now, referring to FIG. 4B, the user inputs a natural language command, "show me houses near Ballard under 600k," which is received by the computer. The computer then displays the natural language command in a command bar 401 in the natural language processing region 402. Receiving inputs (e.g., commands/queries) from a user is discussed in further detail above with reference to FIGS. 1 and 4A.

Based on the displayed data visualization, the computer extracts (512) one or more independent analytic phrases from the natural language command. For example, referring to FIG. 4A, the natural language command received by the computer reads, "show me houses near Ballard." The displayed data visualization 408 (displayed prior to receiving the natural language command) concerns housing sales in Seattle. In some implementations, the computer extracts "houses" and "near Ballard" from the natural language command because these analytic phrases relate to the displayed data visualization 408. When the phrases have direct reference to data fields in the displayed data visualization 408, extraction (512) is straight forward: collect all phrases that are direct references to data fields. For the example in FIG. 4A, on the other hand, the phrase "houses" is only an indirect reference to "housing sales" in the displayed data visualization 408. In some implementations, the computer stems or removes stop words, filler words, or any predefined set of words from the incoming query, and extracts (512) all other phrases from the natural language command because they may be related to the displayed data visualization 408. Some implementations use this approach when the phrases in the natural language command have some indirect reference to the data fields in the displayed visualization 408.

Figure 5A:
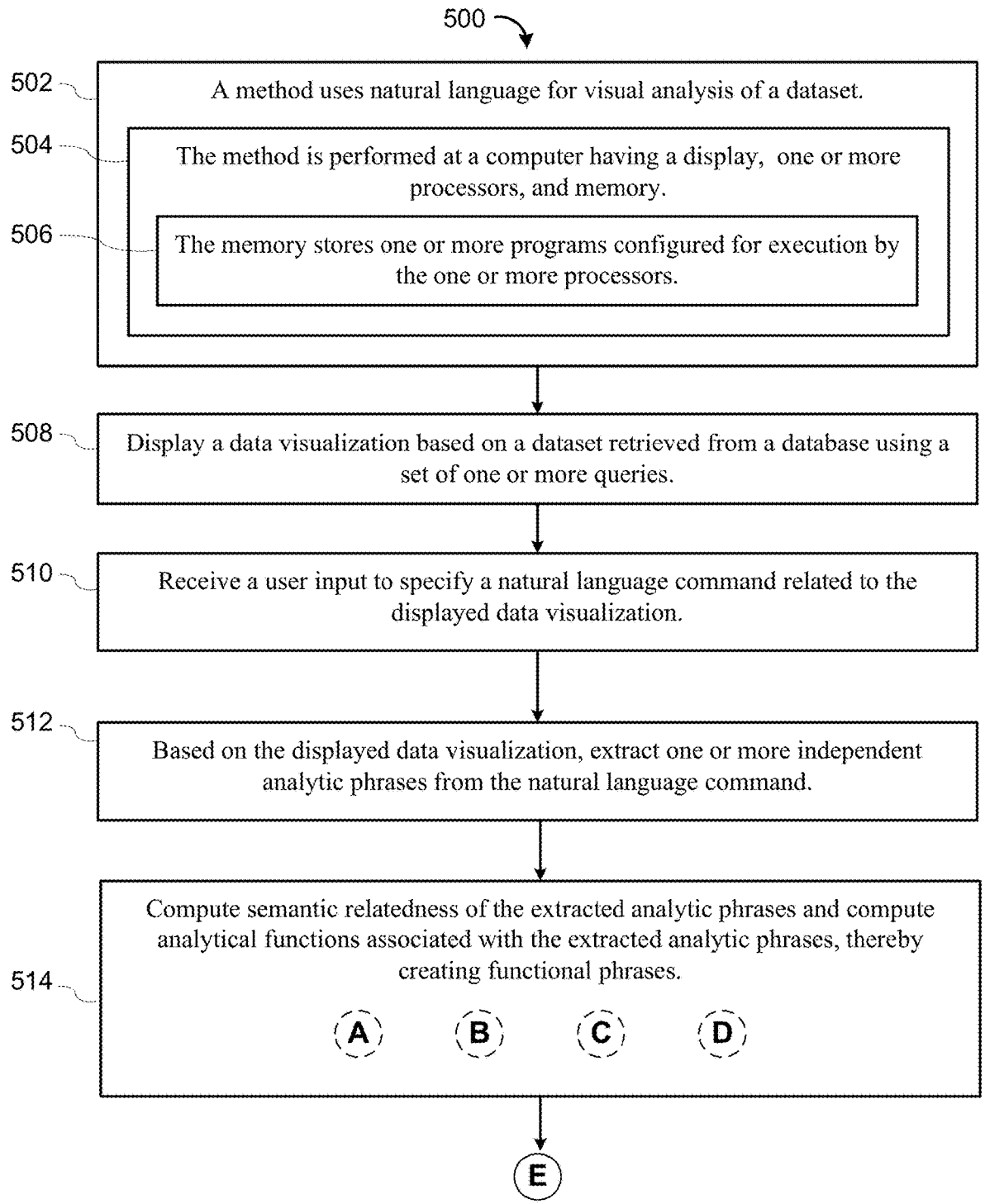
FIGS. 5A-5G provide a flowchart of a process that uses natural language for visual analysis of a dataset according to some implementations.
Figure 5B:
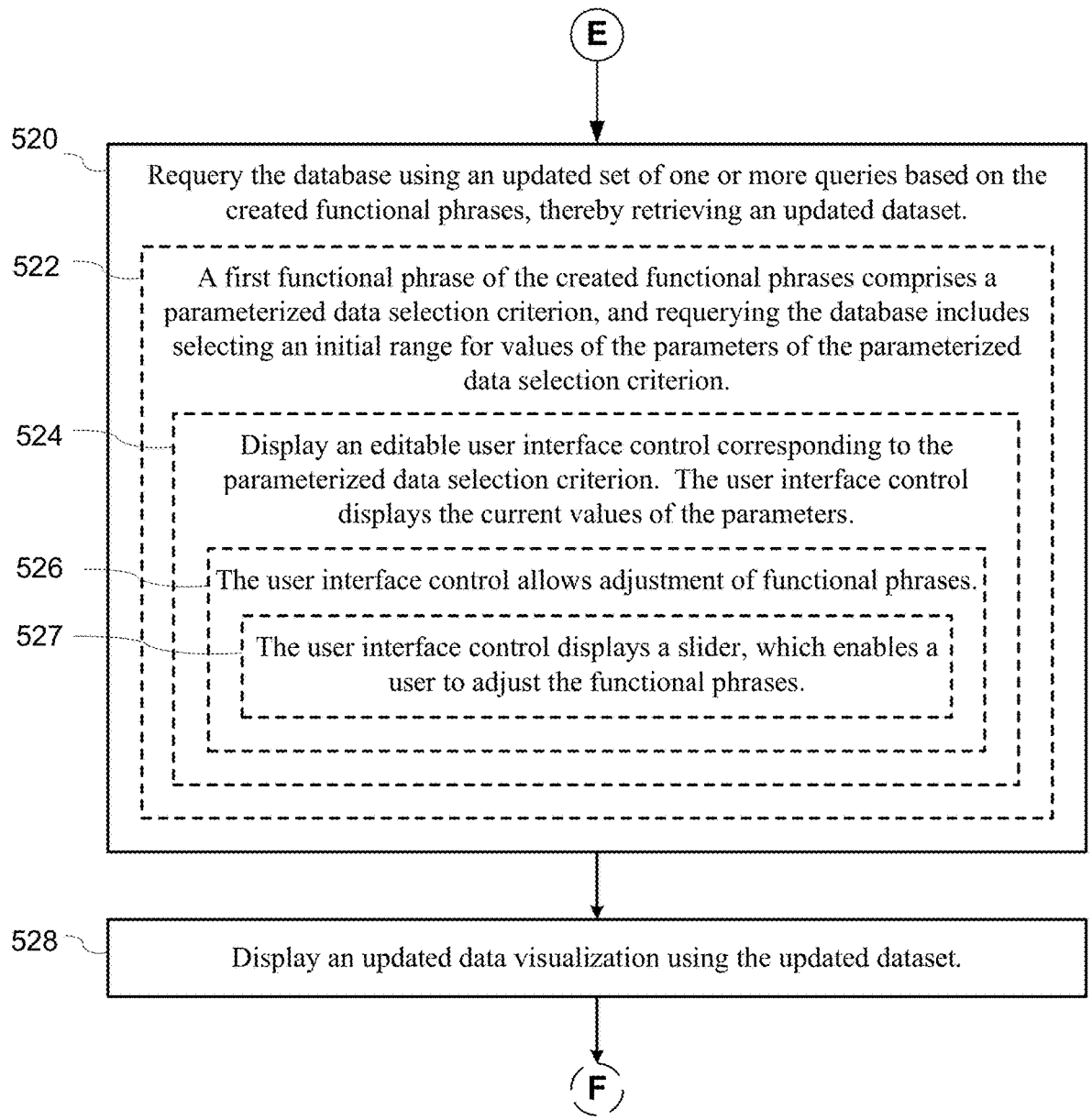
Figure 5C:
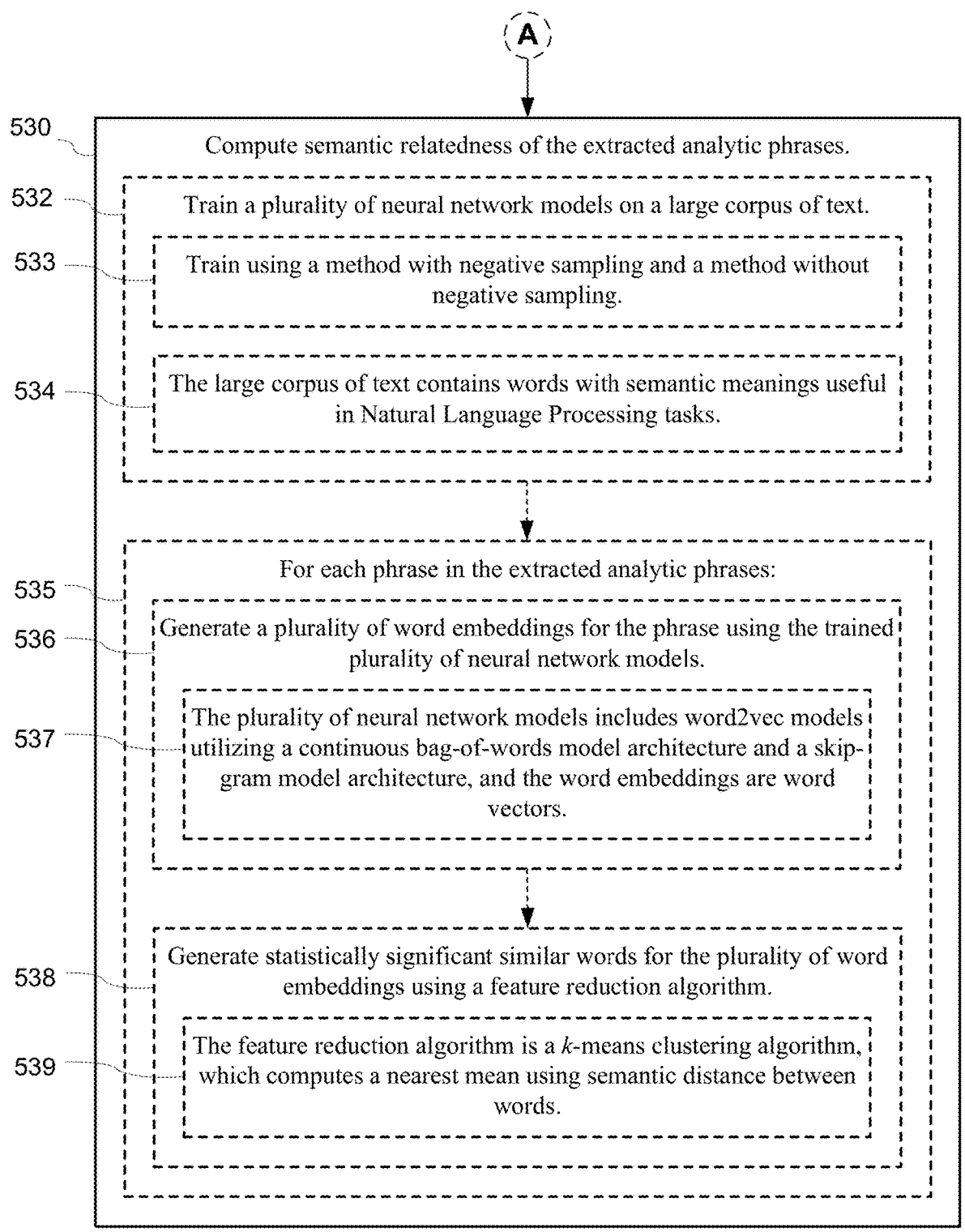
Figure 5D:
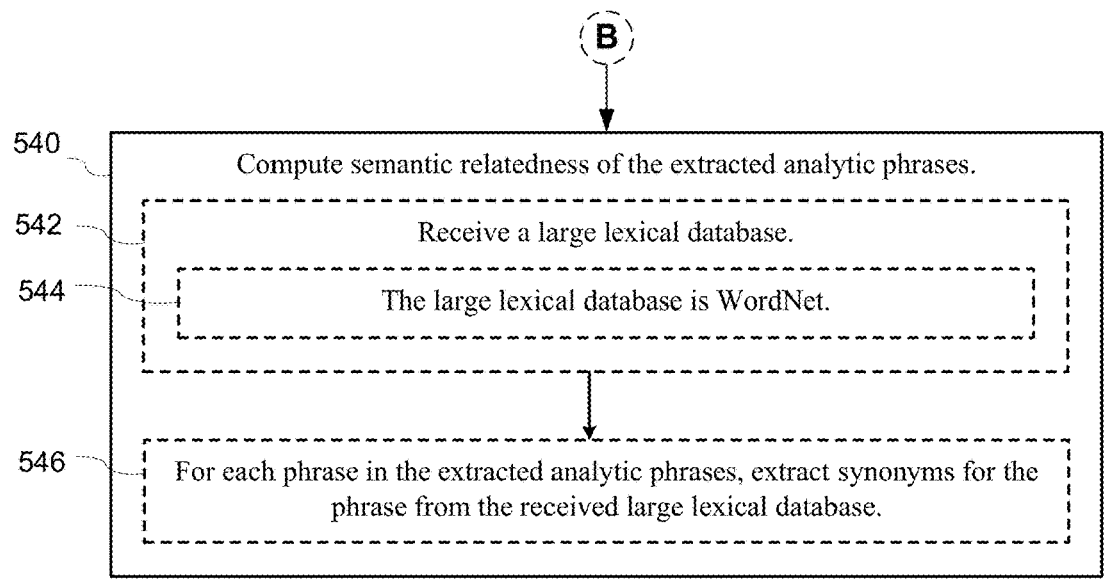

As discussed above with reference to FIGS. 4A-4K, natural language commands often have ambiguity and the user commands include only indirect references to data fields in a dataset. The language processing module 238 computes semantic relatedness of the extracted analytic phrases (as part of step 514) to find similar words. FIGS. 5C and 5D illustrate two implementations for computing semantic relatedness of the extracted analytic phrases. FIG. 5C (530) illustrates a process for computing semantic relatedness using neural network models, according to some implementations. One or more neural network models are first trained (532) using a large corpus of text, described above with reference to FIG. 3A (312), according to some implementations. In some implementations, the neural network models are trained (533) using at least one method with negative sampling and at least one method without negative sampling. In some implementations, the large corpus of text contains (534) words with semantic meanings useful in Natural Language Processing (NLP) tasks.

In some implementations, the language processing module 238 repeats the following steps 535 for each phrase in the extracted analytic phrases. The language processing module 238 generates (536) a plurality of word embeddings for the phrase using the plurality of neural network models trained previously (532). In some implementations, the plurality of neural network models comprises (537) word2vec models utilizing a continuous bag of words model architecture and/or a skip-gram model architecture, and the word embeddings are word vectors, as described in detail above with reference to FIG. 3A (312 and 316). The language processing module 238 generates (538) statistically significant similar words for the plurality of word embeddings using a feature reduction algorithm. In some implementations, the feature reduction algorithm is a k-means clustering algorithm 539 that computes a nearest mean using semantic distance between words.

FIG. 5D illustrates a process for computing (540) semantic relatedness of the extracted analytic phrases via synonym lookup, according to some implementations, described in detail above with reference to FIG. 3A (314 and 315). In some implementations, the language processing module 238 receives (542) a large lexical database, such as WordNet (544). The language processing module 238 extracts (546) synonyms for each phrase from the received large lexical database. For example, referring to FIG. 4H, in response to the user query 404 ("Show me the mansions"), the language processing module 238 derives the synonyms for "mansions" from WordNet. One of the synonyms for "mansions" returned by WordNet is "houses" which the language processing module 238 can then relate to housing data fields in the dataset.

Figure 5E:
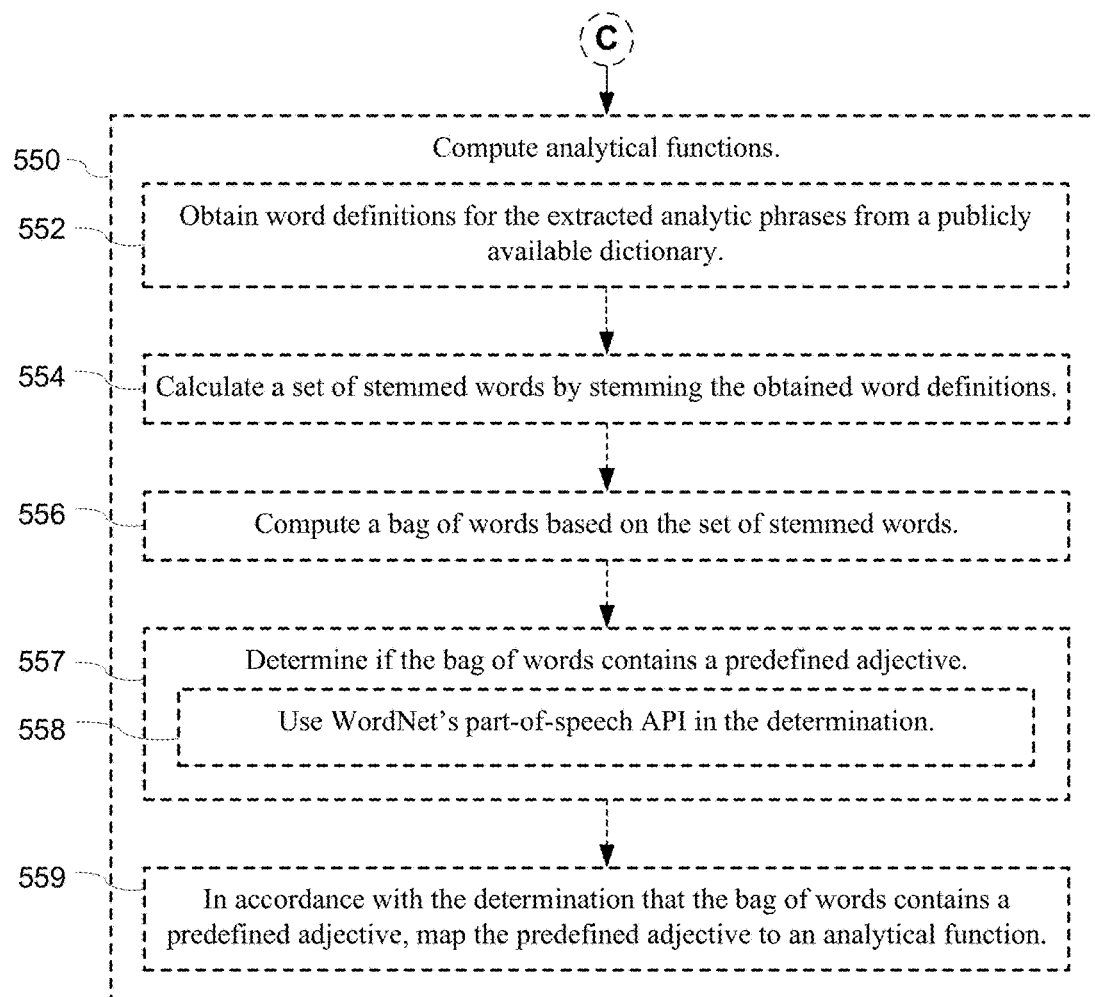
Figure 5F:
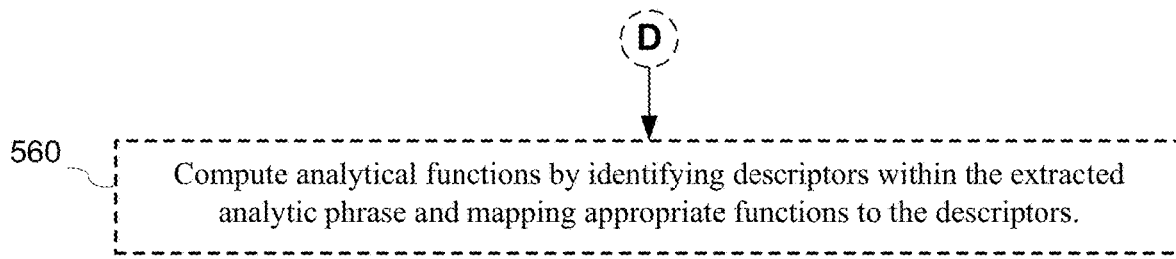

As previously discussed with reference to FIG. 3B, some query words require more than finding semantically related words. For example, referring to FIG. 4H, the query token "mansions" in the user query 404 "Show me the mansions" requires not only finding semantically related "sqft" data field but also the determination that the query refers to the top N percent (corresponding to the analytical function "Top-N") of the "sqft" in the dataset. FIG. 5E illustrates a process of computing (550) analytical functions, such as Top-N, Bottom-N, and mean, according to some implementations. In some implementations, the language processing module 238 obtains (552) word definitions for the extracted analytic phrases from a publicly available dictionary, such as WordNet. For example, the word "mansions" could be defined as "large and imposing houses." In some implementations, the language processing module 238 calculates (554) a set of stemmed words by stemming the obtained word definitions. For the above example, the language processing module 238 calculates the set consisting of "large," "impose" and "house." In some implementations, the language processing module 238 then computes (556) a bag of words consisting of these stem words.

Subsequently, the language processing module 238 determines (557) if the bag of words contains any adjective from a set of predefined adjectives. The set of predefined adjectives is either user-defined or derived from analyzing the specific dataset, and includes adjectives such as "less," "more," "low," and "high." Some implementations use APIs provided by natural language toolkit libraries, such as WordNet's part-of-speech API, to check (558) for the presence of the predefined adjectives. If one of the predefined adjectives is found, the language processing module 238 maps (559) the predefined adjective to an analytical function. For example, "most" is mapped to the function Top-N, "low" is mapped to the function Bottom-N, "average" is mapped to the function mean, and so on. Some implementations compute (560) analytical functions by identifying descriptors within an extracted analytic phrase and mapping appropriate functions to the descriptors. For example, if the input query is "Show me large houses," the computer will map "large" to Top-N. In some implementations, at least one phrase of the functional phrases forms (522) a parameterized data selection criterion. For example, referring to FIG. 4A, the extracted phrase "near Ballard" becomes the parameterized data selection criterion "distance <=parameter", where "distance" is a data field in the data set.

The computer requeries (520, FIG. 5B) the database using an updated set of one or more database queries based on the extracted analytic phrases, thereby retrieving an updated dataset. For example, if the natural language command is "show me houses near Ballard," the computer queries the database for housing sales data near Ballard, Seattle. Requerying the database is discussed in further detail above with reference to FIGS. 4A-4K. In some instances, requerying is performed locally at the computing device using locally saved or cached data, even if the data source is at a remote server.

Although parameterized data selection criteria commonly involve numeric data fields (e.g., geographic distance from a designated region), the same techniques are also applied to categorical fields. For example, an analyst may review sales for a chain of hardware stores. Rather than looking at all sales, the analyst may specify a natural language command to see the sales of appliances or sales of products from a particular supplier. In some implementations, the language module 238 can correlate the term "appliances" or the supplier name to a data field in the data set, and correlate the request to one or more specific data values for the data field. For example, the data source for the hardware store may include a data field called "Product Type" or "Product Category" and have a data value of "appliance" for the appliances. For parameterized data selection criteria using categorical data, the corresponding ambiguity widget is typically a control that allows selection of multiple items (e.g., a multi-select drop-down list).

In some implementations, when requerying the database using the updated set of one or more database queries, the computer selects (522) initial values for parameters of the parameterized data selection criterion. For example, referring to FIG. 4A, the computer selects an initial value of "20" miles for the parameter in "distance <=parameter". Selecting initial parameter values is discussed in more detail above with reference to FIGS. 4A-4K.

In response, the computer displays (528) an updated data visualization using the updated dataset. For example, referring to FIG. 4A, the computer displays an updated data visualization 408. The updated data visualization 408 (as shown in FIG. 4A) displays housing sales near Ballard within distance <=20 miles (initial value of parameter), between the years 2013 and 2015. The updated data visualization 408 corresponds to the updated dataset. Displaying updated data visualizations is discussed in further detail above with reference to FIG. 4A.

In some implementations, the computer displays (524) an editable user interface control (e.g., a user control interface 409) corresponding to the parameterized data selection criterion. The user interface control displays the initial values of the parameters for the parameterized data selection criterion. For example, referring to FIG. 4A, the computer displays the user control interface 409 near the bottom of the updated data visualization 408, according to some implementations. In some implementations, a slider bar of the user control interface 409 is initially set to 20, meaning within 20 miles of Ballard is currently displayed in the updated data visualization 408. In some implementations, the user interface control allows (526) adjustment of functional phrases and receives a second user input at the user interface control, thereby specifying a modified range for a first parameter of the data selection criterion. In some implementations, the user interface control displays (527) a slider by which user input adjusts the functional phrases. For example, referring to FIG. 4A, the user interacts with the slider bar 409 to move the slider bar 409 from a first position (e.g., 20) to a second position (e.g., 30). The user thus specifies a modified range (e.g., not more than 30 miles) for what is considered "near Ballard." In some implementations, the application 230 updates the data visualization based on the modified range for the parameter.

In some implementations, the process alters a data visualization that is already displayed. Because there is already a data visualization, there is a defined data set, and certain data fields are being used in the displayed data visualization. This provides context for the subsequent natural language processing. The natural language processing (including auto-completion of natural language commands based on defined templates, semantics, pragmatics, and disambiguation) can use this context to better understand the user's command. Once the command is processed, the data visualization application 230 displays an updated data visualization according to the command. In some cases, this includes displaying an ambiguity widget.

Figure 5G:
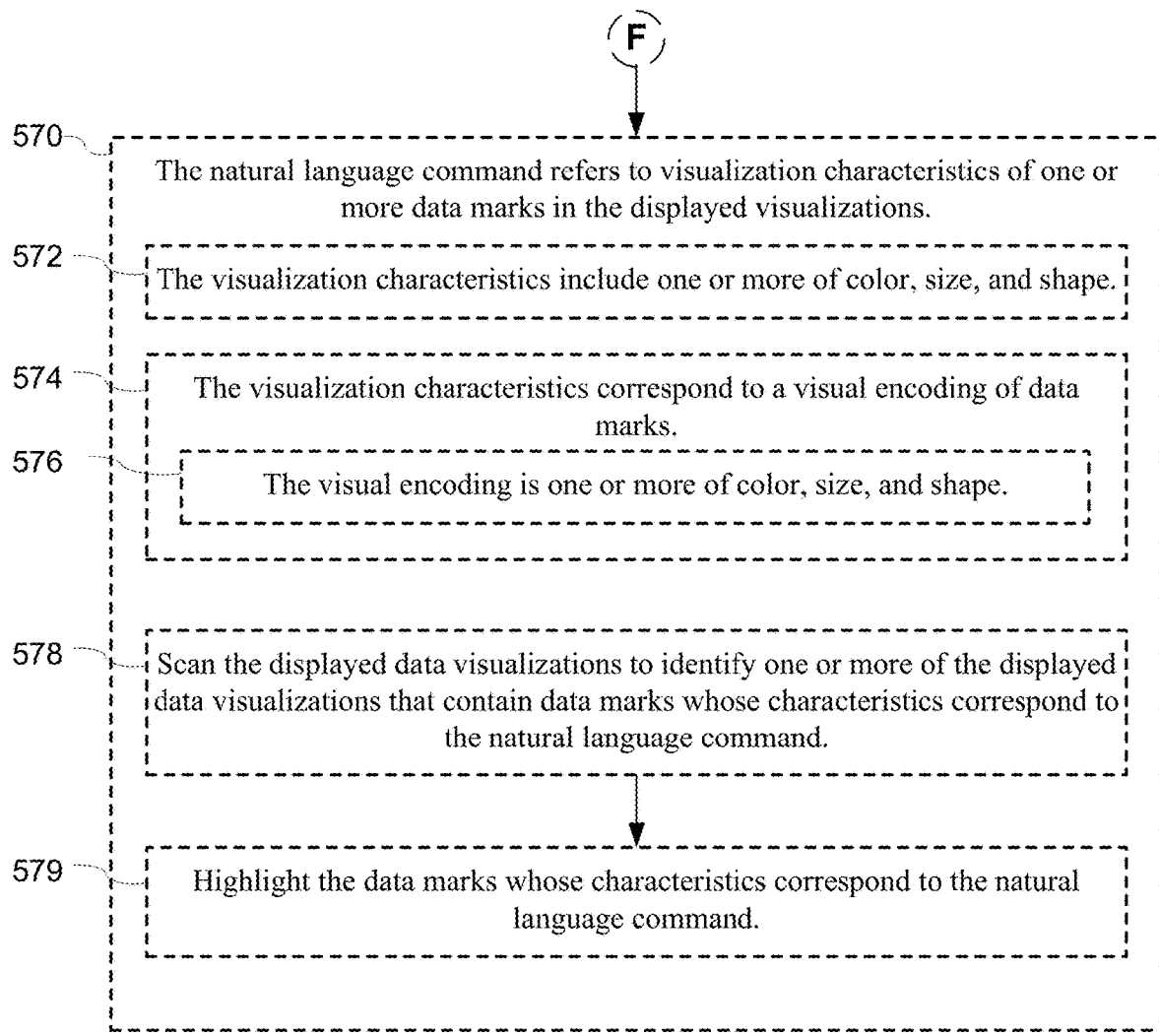

FIG. 5G illustrates processing (570) of natural language commands that refer to visualization characteristics of one or more data marks in the displayed data visualization. In some implementations, the visualization characteristics include (572) one or more of color, shape, and size. In some implementations, the visualization characteristics correspond to (574) a visual encoding of data marks. In some implementations, the visual encoding is (576) one or more of color, size, and shape. In some implementations, the computer scans (578) the displayed data visualizations to identify one or more of the displayed data visualizations that contain data marks whose characteristics correspond to the natural language command, according to some implementations. Some implementations then highlight 579 the data marks whose characteristics correspond to the natural language command. The processing of natural language commands that refer to visualization characteristics is described above in reference to FIGS. 3C and 3D.

The techniques described are able to correlate the words entered (or spoken) by a user to data fields. For example, suppose a user is working with a real estate data set that has a list_price data field. The word "price" is embedded in the field name, and can be correlated to other related words, such as "prices," "pricing," "cost," "expensive," and "cheap." The same techniques can be applied to correlate other categories of words, such as words related to size: "area," "large," "sqft," "square feet," and so on.

Figure 6A:
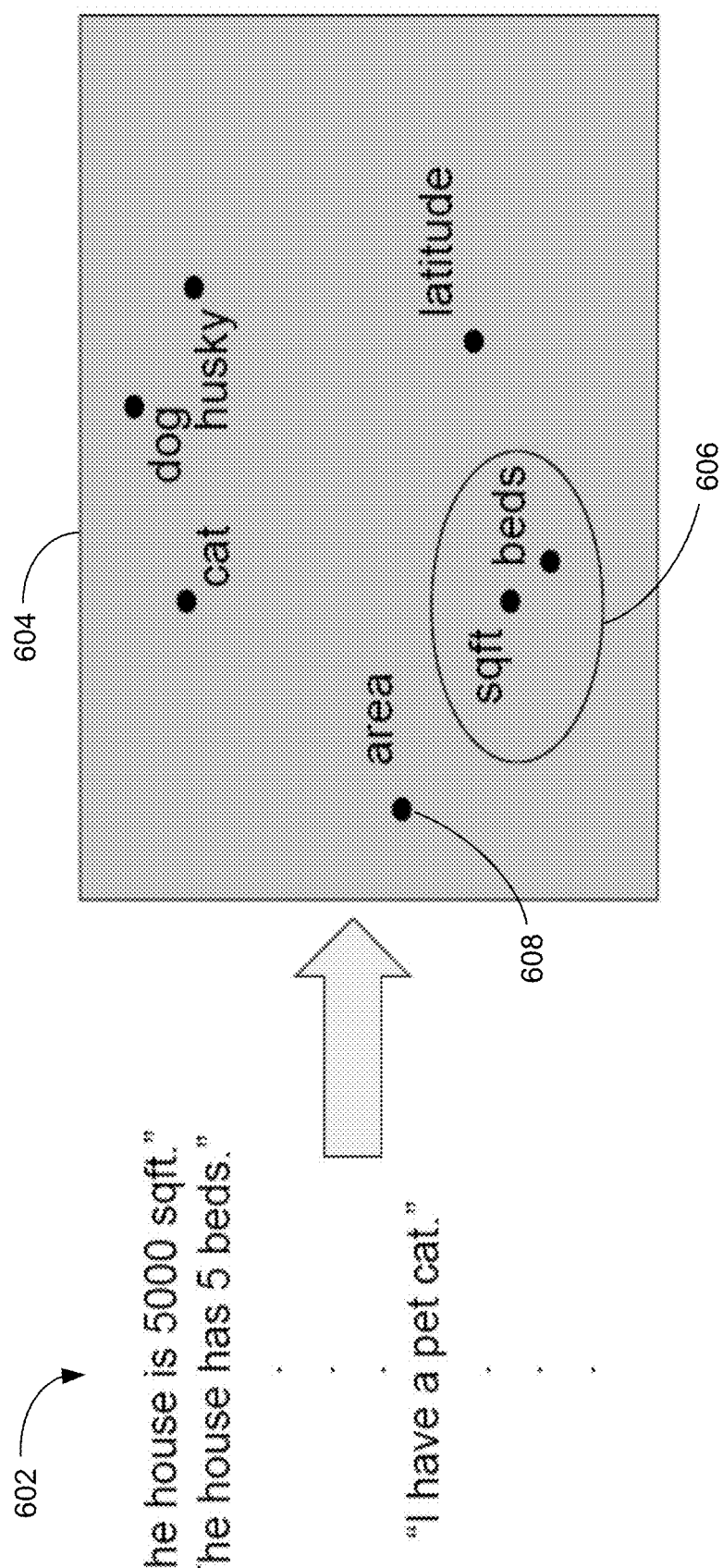
FIGS. 6A-6D illustrate using a multidimensional vector space to represent the relatedness of words according to some implementations.

FIGS. 6A-6D illustrate using a multidimensional vector space to represent the relatedness of words according to some implementations. As illustrated in FIG. 6A, a training set 602 of sentences provides the input, and the context for the words in the training set 602 establishes the vector space 604 of words (e.g., each word is represented by a 50-dimensional vector). With a good training set, the proximity of representations in the vector space (e.g., based on Euclidean distance) should correlate to the relatedness of the words. This example illustrates that the training set selected can skew the results. In particular, because both the word "beds" and the word "sqft" (square feet) appear in the context with the word "house," the word "sqft" is close to the word "beds" in the vector space, as indicated by the oval 606. On the other hand, the word "sqft" is not close to the word "area" 608, even though "sqft" and "area" are closely related semantically.

Figure 6B:
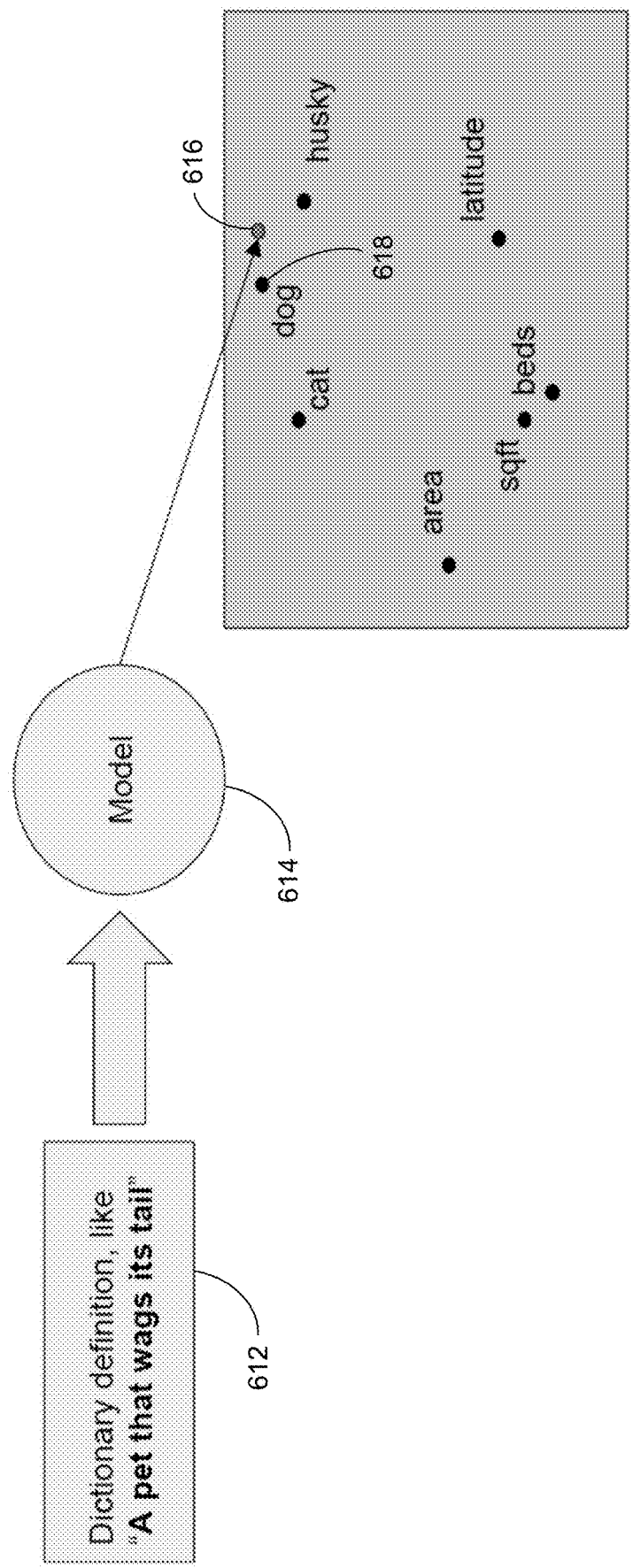

With a vector space of words, a model 614 can be built that maps other words to the vector space, as illustrated in FIG. 6B. For example, "a pet that wags its tail" 612 is mapped to a location 616 that is close to the representation of dog 618 (although perhaps not as close as desired).

Figure 6C:
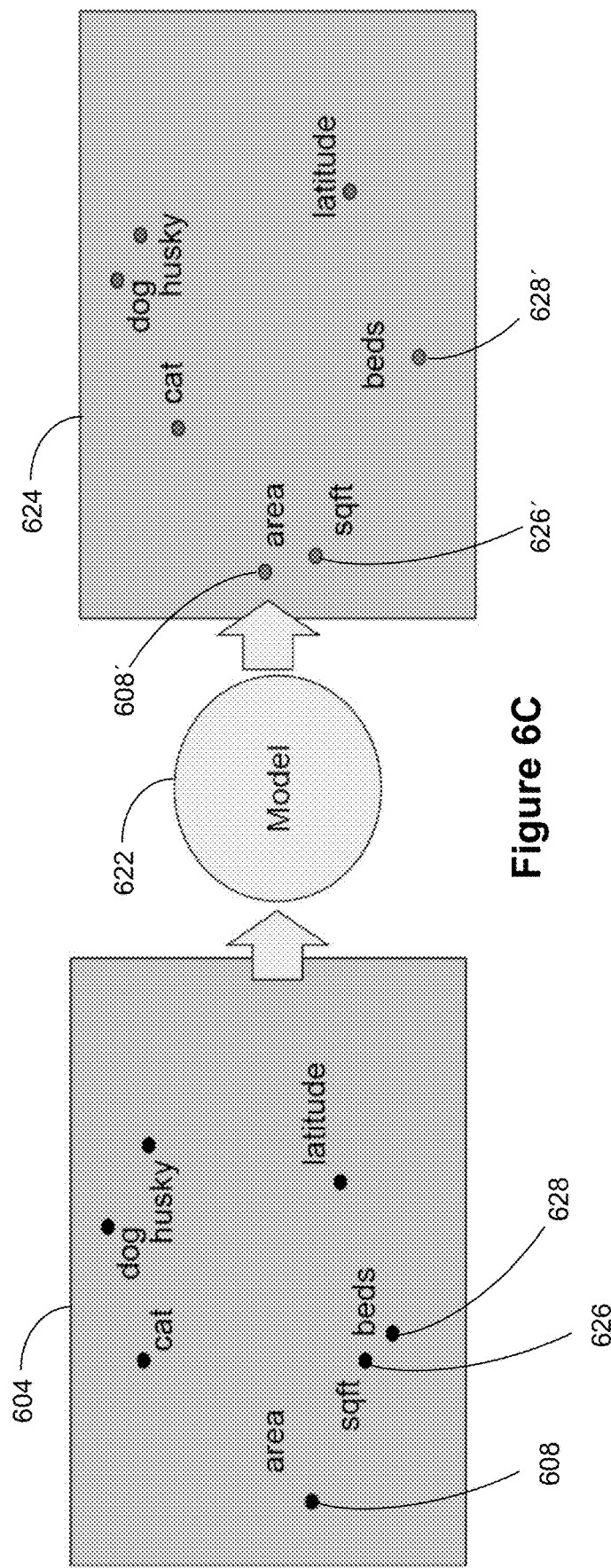

FIG. 6C illustrates adjusting the vector space representations using additional information, such as dictionary definitions. Here, using the additional information transforms (622) the original vector space 604 of representations into a new vector space 624 of representations. In some implementations, the vector space has exactly the same components, and only the representations of the words are changed. In some implementations, one or more vector space dimensions is added, removed, or modified in the transformation process. As illustrated in FIG. 6C, each of the words "area" 608, "sqft" 626, and "beds" 628 has a new representation in the new vector space 624. In particular, the new representations 608', 626', and 628' are different from the original representations. In particular, the new "sqft" representation 626' is now much closer to the new "area" representation 608' and the new "sqft" representation 626' is now much further from the new "beds" representation 628'.

Figure 6D:
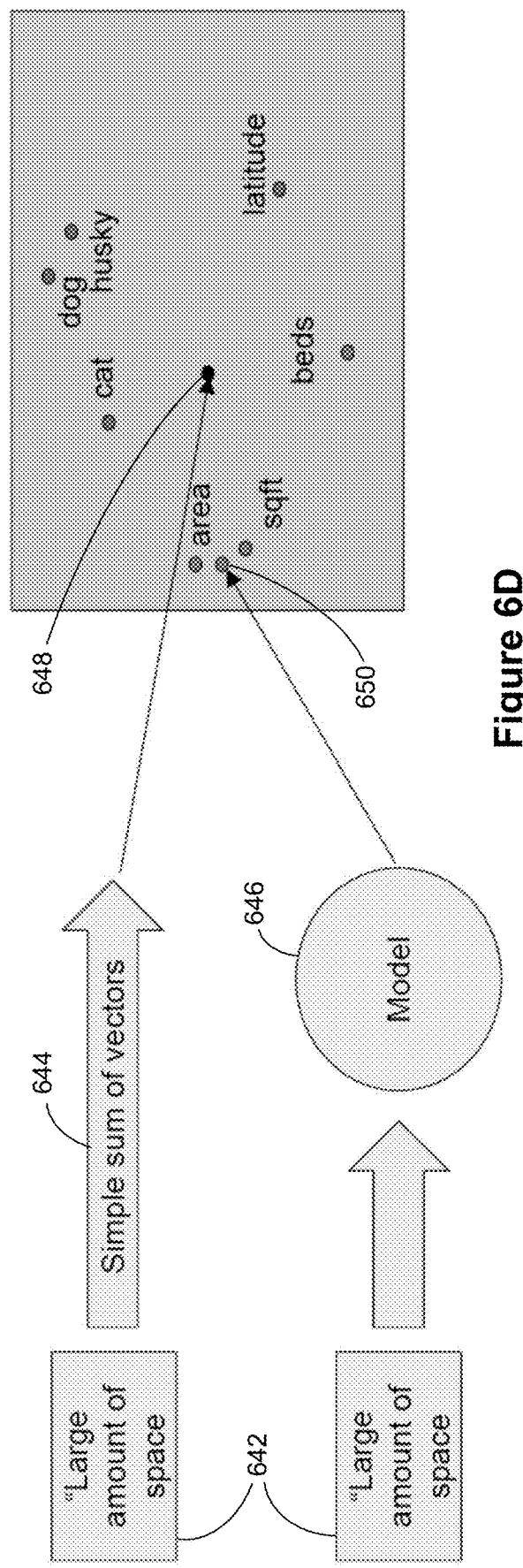

FIG. 6D illustrates the difference between two methods for building a vector representation of a phrase with multiple words. Using the simple sum of vectors approach 644, the input phrase 642 is treated as a set of independent words. Each of the independent words is mapped to a vector representation, and the vector representation 648 for the phrase is the sum of the individual vectors. Not surprisingly, this approach can lead to poor results because the context within a phrase frequently matters (e.g., the words are not independent). In the second approach, the entire phrase 642 is modeled (646) as a whole, and the meaning of the phrase 642 is mapped to the vector space. As illustrated in this example, the input phrase "large amount of space" 642 is mapped to a representation 650, which is close to the representation 608' for area.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of using natural language for visual analysis of a dataset, comprising:
   at computer having a display, one or more processors, and memory storing one or more programs configured for execution by the one or more processors:
   displaying, on the display, a data visualization application, including displaying a data visualization based on a dataset retrieved from a database using a set of one or more queries;
   receiving, by the data visualization application, a user input to specify a natural language command related to the displayed data visualization;
   based on the displayed data visualization, extracting one or more independent analytic phrases from the natural language command;
   for a first analytic phrase of the one or more extracted analytic phrases:
      computing semantic relatedness between the first analytic phrase and numeric data fields in the dataset, wherein computing semantic relatedness includes:
         generating a plurality of word embeddings for the first analytic phrase using a plurality of neural network models trained on a large corpus of text; and
         generating statistically similar words for the plurality of word embeddings using a feature reduction algorithm;
      identifying one or more of the numeric data fields having highest computed semantic relatedness to the first analytic phrase; and
      selecting a numerical function according to the first analytic phrase, wherein the numerical function compares data values in the one or more numeric data fields to a threshold value;
   retrieving an updated dataset, including requerying the database using an updated set of one or more queries to filter the one or more identified numeric data fields according to the numeric function; and
   displaying, on the display in the data visualization application, an updated data visualization using the updated dataset.

2. The method of claim 1, wherein the plurality of neural network models comprises word2vec models, the word2vec models utilizing a continuous bag of words model architecture and a skip-gram model architecture, and wherein the word embeddings are word vectors.

3. The method of claim 1, wherein training the plurality of neural network models comprises a plurality of training methods, the plurality of training methods including a training method with negative sampling and a training method without negative sampling.

4. The method of claim 1, wherein the large corpus of text contains words with semantic meanings useful in Natural Language Processing (NLP) tasks.

5. The method of claim 1, wherein the feature reduction algorithm is a k-means clustering algorithm, wherein the k-means clustering algorithm computes a nearest mean using semantic distance between words.

6. The method of claim 1, wherein computing semantic relatedness between the first analytic phrase and numeric data fields in the dataset further comprises:
   receiving a large lexical database; and
   for the first analytic phrase, extracting synonyms for the phrase from the received large lexical database.

7. The method of claim 1, wherein selecting the numerical function comprises:
   obtaining word definitions for the first analytic phrase from a publicly available dictionary;
   calculating a set of stemmed words by stemming the obtained word definitions;
   computing a bag of words based on the set of stemmed words;
   determining whether the bag of words contains a predefined adjective; and
   in accordance with the determination that the bag of words contains the predefined adjective, mapping the predefined adjective to an analytical function.

8. The method of claim 7, wherein determining whether the bag of words contains the predefined adjective comprises using a part-of-speech API provided by a natural language toolkit library to check for the presence of the predefined adjective.

9. The method of claim 1, wherein computing the numerical function comprises identifying descriptors within the first analytic phrase and mapping appropriate functions to the descriptors.

10. The method of claim 1, wherein a first numerical function of the created functional phrases comprises a parameterized data selection criterion, and wherein requerying the database to filter the one or more identified numeric data fields according to the numeric functions includes selecting an initial range for values of the parameters of the parameterized data selection criterion.

11. The method of claim 10, further comprising displaying an editable user interface control corresponding to the parameterized data selection criterion, wherein the user interface control displays the current values of the parameters.

12. The method of claim 11, wherein the user interface control includes a control to adjust the numerical function.

13. The method of claim 12, wherein the user interface control displays a slider for adjusting the numerical function.

14. The method of claim 1, wherein, when the natural language command refers to visualization characteristics of one or more data marks in the displayed data visualizations, the method further comprises:
   scanning the displayed data visualizations to identify one or more of the displayed data visualizations that contain data marks whose characteristics correspond to the natural language command; and
   highlighting the data marks whose characteristics correspond to the natural language command.

15. The method of claim 14, wherein the visualization characteristics include one or more of color, size, and shape.

16. The method of claim 14, wherein the visualization characteristics correspond to a visual encoding of data marks.

17. The method of claim 16, wherein the visual encoding is one or more of color, size, and shape.

18. An electronic device, comprising:
a display;
one or more processors;
memory; and
one or more programs, wherein the one or more programs are stored in the memory and configured to be executed by the one or more processors, the one or more programs including instructions for:
   displaying, on the display, a data visualization application, including displaying a data visualization based on a dataset retrieved from a database using a set of one or more queries;
   receiving, by the data visualization application, a user input to specify a natural language command related to the displayed data visualization;
   based on the displayed data visualization, extracting one or more independent analytic phrases from the natural language command;
   for a first analytic phrase of the one or more extracted analytic phrases:
      computing semantic relatedness between the first analytic phrase and numeric data fields in the dataset, wherein computing semantic relatedness includes:
         generating a plurality of word embeddings for the first analytic phrase using a plurality of neural network models trained on a large corpus of text; and
         generating statistically similar words for the plurality of word embeddings using a feature reduction algorithm;
      identifying one or more of the numeric data fields having highest computed semantic relatedness to the first analytic phrase; and
      selecting a numerical function according to the first analytic phrase, wherein the numerical function compares data values in the one or more numeric data fields to a threshold value;
   retrieving an updated dataset, including requerying the database using an updated set of one or more queries to filter the one or more identified numeric data fields according to the numeric function; and
   displaying, on the display in the data visualization application, an updated data visualization using the updated dataset.

19. A non-transitory computer readable storage medium storing one or more programs configured for execution by an electronic device with a display, the one or more programs comprising instructions for:
   displaying, on the display, a data visualization application, including displaying a data visualization based on a dataset retrieved from a database using a set of one or more queries;
   receiving, by the data visualization application, a user input to specify a natural language command related to the displayed data visualization;
   based on the displayed data visualization, extracting one or more independent analytic phrases from the natural language command;
   for a first analytic phrase of the one or more extracted analytic phrases:
      computing semantic relatedness between the first analytic phrase and numeric data fields in the dataset, wherein computing semantic relatedness includes:

generating a plurality of word embeddings for the first analytic phrase using a plurality of neural network models trained on a large corpus of text; and generating statistically similar words for the plurality of word embeddings using a feature reduction algorithm;

identifying one or more of the numeric data fields having highest computed semantic relatedness to the first analytic phrase; and selecting a numerical function according to the first analytic phrase, wherein the numerical function compares data values in the one or more numeric data fields to a threshold value;

retrieving an updated dataset, including requerying the database using an updated set of one or more queries to filter the one or more identified numeric data fields according to the numeric function; and displaying, on the display in the data visualization application, an updated data visualization using the updated dataset.

\* \* \* \* \*